United States Patent
Hiroyasu

(10) Patent No.: US 7,731,474 B2
(45) Date of Patent: Jun. 8, 2010

(54) CASSETTE INSERTION CONTROL METHOD

(75) Inventor: Makoto Hiroyasu, Ehime (JP)

(73) Assignee: Panasonic Corporation, Osaka (JP)

( * ) Notice: Subject to any disclaimer, the term of this patent is extended or adjusted under 35 U.S.C. 154(b) by 577 days.

(21) Appl. No.: 11/661,764

(22) PCT Filed: Jan. 16, 2006

(86) PCT No.: PCT/JP2006/300452

§ 371 (c)(1),
(2), (4) Date: Mar. 2, 2007

(87) PCT Pub. No.: WO2006/077796

PCT Pub. Date: Jul. 27, 2006

(65) Prior Publication Data

US 2008/0080961 A1   Apr. 3, 2008

(30) Foreign Application Priority Data

Jan. 20, 2005   (JP)   ............... 2005-012178

(51) Int. Cl.
*B65G 1/137* (2006.01)
(52) U.S. Cl. .......... 414/807; 414/280; 369/30.43; 700/218
(58) Field of Classification Search ............ 369/30.43, 369/30.45, 30.49; 414/275, 280, 807; 700/218
See application file for complete search history.

(56) References Cited

U.S. PATENT DOCUMENTS

| | | | |
|---|---|---|---|
| 4,981,409 A | * | 1/1991 | Hirose et al. ........... 414/223.01 |
| 5,622,470 A | * | 4/1997 | Schaefer et al. .......... 414/807 |
| 6,022,180 A | * | 2/2000 | Motoyama et al. ......... 414/277 |
| 6,198,593 B1 | * | 3/2001 | Hori et al. ............ 360/92.1 |
| 7,106,538 B2 | * | 9/2006 | Minemura et al. ......... 360/71 |
| 7,162,329 B2 | * | 1/2007 | Dimitri et al. ........... 700/214 |
| 7,360,982 B2 | * | 4/2008 | Hiraguchi et al. ......... 414/280 |
| 7,387,485 B2 | * | 6/2008 | Dickey et al. .......... 414/277 |

FOREIGN PATENT DOCUMENTS

| | | | | |
|---|---|---|---|---|
| JP | 60-79555 | | 5/1985 | |
| JP | 61-188303 A | * | 8/1986 | ............ 414/280 |
| JP | 2005-317056 | | 11/2005 | |

OTHER PUBLICATIONS

"DDS-built-in Backup Library," New Technology of Matsushita Electric Technology Industrial Co., Ltd. 2002, May 2003, pp. 155-156.

* cited by examiner

*Primary Examiner*—James Keenan
(74) *Attorney, Agent, or Firm*—Steptoe & Johnson LLP

(57) ABSTRACT

A cassette insertion control method, wherein when a cassette (1) is sent to the storage part (41) of a garage (8a), the cassette (1) is tilted without positioning the garage (8a) and the cassette (1) to oppose to each other, and sent to the front opening part (40) of the garage (8a) from a tip corner part (45) of the cassette (1), thereby to securely store the cassette (1) in the garage (8a). Thus, even if the accuracy of the stop position of a picker running in a direction parallel with the arranged direction of the garage is not so high, the cassette can be securely stored in the garage.

6 Claims, 17 Drawing Sheets

CASSETTE INSERTION CONTROL METHOD

The present application is based on International Application PCT/JP2006/300452, filed Jan. 16, 2006, which claims priority to Japanese Patent Application No. 2005-012178, filed Jan. 20, 2005, the entire contents of which are hereby incorporated by reference.

TECHNICAL FIELD

The present invention relates to a cassette insertion control method of a cassette library device or the like. In particular, the present invention relates to a cassette insertion control method for sending a cassette, such as a tape cassette, held by a picker having a turn table structure to a garage in order to store the cassette in the garage.

BACKGROUND ART

In a cassette library device of this type, as illustrated in FIG. 15, a plurality of garages 4 are annularly mounted on a turn table 2, and a cassette 1 is stored in each garage 4. Then, a drive mechanism 3 rotates the turn table 2 such that a garage 4 having a target cassette 1 stored therein faces an elevator mechanism 5. The elevator mechanism 5 takes out the target cassette 1 from the garage 4, and inserts/removes the cassette 1 into/from a tape drive 6; thus, information is read from/written to the cassette 1 (Non-Patent Document 1).

With this configuration, a cassette can be automatically inserted into/removed from the tape drive 6 within a range of a data library contained in the turn table 2. However, in order to increase, in number, cassettes 1 to be stored as a data library in a limited space, a magazine-type cassette library device illustrated in FIG. 16 is suitable as compared with the aforementioned turn table-type cassette library device.

The magazine-type cassette library device has a configuration that a tape drive 6 and a pair of magazine-type garages 8a and 8b are mounted in a casing 7.

A plurality of cassettes 1 arranged in a line are stored in each of the garages 8a and 8b. A picker 9 interposed between the pair of garages 8a and 8b transfers a cassette 1 between the garage 8a (8b) and the tape drive 6.

FIGS. 17(a), 17(b), 17(c) and 18 illustrate one example of a cassette 1.

The cassette 1 is formed into a thin, rectangular parallelepiped shape as illustrated in FIGS. 17(a) to 17(c). Recesses 10a and 10b are formed at both ends on a bottom side of the cassette 1. The cassette 1 includes a bottom face 11 and side faces 12a and 12b.

As illustrated in FIG. 16, a cassette 1 is stored in one of the garages 8a and 8b such that recesses 10a and 10b thereof are located at an open side of the garage 8a (8b), that is, the recesses 10a and 10b are located near the picker 9.

As illustrated in FIGS. 16 and 19, the picker 9 includes a movable unit 15 capable of moving in a horizontal direction. As illustrated in FIGS. 16 to 19, the movable unit 15 has a pair of rocking arms 16a and 16b each capable of rocking in a vertical direction. As illustrated in FIG. 18, each of the rocking arms 16a and 16b includes a main body 17 extending in the horizontal direction and a tip end 18 bent upward at one end of the main body 17.

When the rocking arms 16a and 16b rock upward in a state that the movable unit 15 of the picker 9 approaches the cassette 1 stored in the garage 8a (8b) as illustrated in FIG. 19, the main bodies 17 come into contact with the bottom face 11 of the cassette 1 and the tip ends 18 are fitted into the recesses 10a and 10b. Thus, the rocking arms 16a and 16b chuck the cassette 1.

In this state, the movable body 15 moves so as to be away from the garages 8a and 8b, so that the cassette 1 can be taken out from the garage 8a (8b).

As illustrated in FIGS. 16 and 19, the movable unit 15 has guide rails 19, and the cassette 1 taken out from the garage 8a (8b) is placed on the guide rails 19. Thus, transfer of the cassette 1 from one of the garages 8a and 8b to the picker 9 is completed.

Non-Patent Document 1: "2002 New Technology of Matsushita Electric", May 2003, pp. 155-159, (DDS-Equipped Backup Library), issued by R&D Planning Office of Matsushita Electric Industrial

DISCLOSURE OF THE INVENTION

Problems to be Solved by the Invention

In order to store a cassette 1 in the garage 8a (8b), for example, the rocking arms 16a and 16b of the movable unit 15 chuck the cassette 1 taken out from the tape drive 6 and, then, transfer the cassette 1 to the picker 9.

Next, it is assumed that the garage 8a (8b), in which the cassette 1 will be stored, is out of a moving range of the picker 9 or the cassette 1 cannot be stored in the garage 8a (8b) due to an obstacle existing in front of an open side of the garage 8a (8b). Herein, the garage 8a (8b), in which the cassette 1 will be stored, runs in a direction parallel with an arranged direction of the garages 8a and 8b toward a target position in which the cassette 1 will be stored. The garage 8a (8b) stops after arrival at the target position in which the cassette 1 will be stored.

Then, the picker 9 runs in the direction parallel with the arranged direction of the garages 8a and 8b toward the target position, in which the cassette 1 will be stored, of the garage 8a (8b). The picker 9 stops after arrival at the target position in which the cassette 1 will be stored.

Then, the movable unit 15 moves so as to approach the garage 8a (8b), that is, moves in a direction orthogonal to the running direction of the picker 9. After the cassette 1 is stored in the garage 8a (8b), the rocking arms 16a and 16b rock so as to release the chuck of the cassette 1. Thereafter, the movable unit 15 returns to an original position spaced away from the garages 8a and 8b.

Herein, in order to securely store the cassette 1 in the garage 8a (8b), the picker 9 and the garage 8a (8b), each running in the direction parallel with the arranged direction of the garages 8a and 8b, must stop at the position in which the cassette 1 will be stored with good accuracy.

In other words, the picker 9 and the garage 8a (8b) must stop with high positional accuracy. If failing to secure desired stop accuracy, there arises a technical problem that the cassette 1 is obliquely inserted into or cannot be inserted into the garage 8a (8b).

If the cassette 1 is obliquely inserted into or cannot be inserted into the garage 8a (8b), an operation of the cassette library device is halted and, then, the following actions must be performed manually before restart of the operation. That is, the cassette 1 is normally inserted into the garage 8a (8b), the cassette 1 is taken out from the cassette library device, or the cassette library device is repaired or adjusted. Consequently, it becomes impossible to realize an automatic operation that is originally intended for the cassette library device.

The present invention is made to solve the aforementioned problems. An object of the present invention is to provide a tape library device capable of securely storing a cassette in a garage by means of a picker even when accuracy of a stop position of the picker or the garage running in a direction parallel with an arranged direction of the garage is not so high.

Means for Solving the Problems

According to a first aspect of the present invention, there is provided a cassette insertion control method for transferring a cassette held by a picker to a storage section partitioned by a pair of side plates through a front opening part of a garage, the cassette insertion control method comprising: a first step of moving the picker in a horizontal direction such that a vertical center axis serving as a center when the cassette held by the picker rotates approaches a target stop position deviated from a center position of the front opening part of the garage; a second step of rotating the cassette held by the picker about the center axis such that the cassette is tilted with respect to the storage section of the garage without opposing the storage section of the garage; a third step of allowing the cassette to approach the storage section such that a first tip corner part of the tilted cassette enters the storage section through the front opening part of the garage; a fourth step of further rotating the tilted cassette about the center axis in a direction that the first tip corner part of the cassette comes into contact with the side plate in a state that a second tip corner part of the cassette is prevented from coming into contact with the side plate; a fifth step of allowing the cassette to further approach the storage section; a sixth step of moving the picker in the horizontal direction such that the cassette held by the picker approaches the center position; and a seventh step of pushing out the cassette toward the storage section, thereby to transfer the cassette from the picker to the storage section.

In a case that a cassette opposing a garage is sent to the garage, one side of the cassette, located near the garage, must be entirely contained in an opening part of the garage. Therefore, if accuracy of a stop position of the picker or the garage is not so high, one side of the cassette is not contained in the opening part of the garage, so that the cassette cannot be inserted into the garage.

With the configuration according to the present invention, however, if only a tip corner part of the cassette is contained in the opening part of the garage, the cassette can be sent to the garage. Therefore, even when the picker stops while being misaligned with the garage due to low accuracy of the stop position of the picker or the garage, the cassette can be securely stored in the garage by means of the picker.

According to a second aspect of the present invention, there is provided a cassette insertion control method for transferring a cassette held by a picker to a storage section partitioned by a pair of side plates through a front opening part of a garage, the cassette insertion control method comprising: a first step of moving the picker in a horizontal direction such that a vertical center axis serving as a center when the cassette held by the picker rotates approaches a target stop position deviated from a center position of the front opening part of the garage; a second step of rotating the cassette held by the picker about the center axis such that the cassette is tilted with respect to the storage section of the garage without opposing the storage section of the garage; a third step of allowing the cassette to approach the storage section such that a first tip corner part of the tilted cassette enters the storage section through the front opening part of the garage; a fourth step of further rotating the tilted cassette about the center axis in a direction that the first tip corner part of the cassette comes into contact with the side plate in a state that a second tip corner part of the cassette is prevented from coming into contact with the side plate; a fifth step of allowing the cassette to further approach the storage section; a sixth step of moving the picker in the horizontal direction such that the cassette held by the picker approaches the center position; and a seventh step of pushing out the cassette toward the storage section, thereby to transfer the cassette from the picker to the storage section, wherein the second step of rotating the cassette held by the picker about the vertical center axis such that the cassette is tilted with respect to the storage section of the garage without opposing the storage section of the garage is performed prior to the first step of moving the picker in the horizontal direction such that the center axis about which the cassette held by the picker rotates approaches the target stop position deviated from the center position of the front opening part of the garage.

According to a third aspect of the present invention, there is provided a cassette insertion control method for transferring a cassette held by a picker to a storage section partitioned by a pair of side plates through a front opening part of a garage, the cassette insertion control method comprising: a first step of moving the picker in a horizontal direction such that a vertical center axis serving as a center when the cassette held by the picker rotates approaches a target stop position deviated from a center position of the front opening part of the garage; a second step of rotating the cassette held by the picker about the center axis such that the cassette is tilted with respect to the storage section of the garage without opposing the storage section of the garage; a third step of allowing the cassette to approach the storage section such that a first tip corner part of the tilted cassette enters the storage section through the front opening part of the garage; a fourth step of further rotating the tilted cassette about the center axis in a direction that the first tip corner part of the cassette comes into contact with the side plate in a state that a second tip corner part of the cassette is prevented from coming into contact with the side plate; a fifth step of allowing the cassette to further approach the storage section; a sixth step of moving the picker in the horizontal direction such that the cassette held by the picker approaches the center position; and a seventh step of pushing out the cassette toward the storage section, thereby to transfer the cassette from the picker to the storage section, wherein the second step of rotating the cassette held by the picker about the vertical center axis such that the cassette is tilted with respect to the storage section of the garage without opposing the storage section of the garage is performed during a period of the first step of moving the picker in the horizontal direction such that the center axis about which the cassette held by the picker rotates approaches the target stop position deviated from the center position of the front opening part of the garage.

According to a fourth aspect of the present invention, in the cassette insertion control method according to the first aspect, in at least one of the first step of moving the picker in the horizontal direction such that the center axis approaches the target stop position deviated from the center position of the front opening part of the garage and the sixth step of moving the picker in the horizontal direction such that the cassette held by the picker approaches the center position, the picker does not move relative to the garage, but the picker and the garage move relatively in the horizontal direction so as to be aligned with each other.

According to a fifth aspect of the present invention, in the cassette insertion control method according to the second aspect, in at least one of the first step of moving the picker in the horizontal direction such that the center axis approaches the target stop position deviated from the center position of the front opening part of the garage and the sixth step of moving the picker in the horizontal direction such that the cassette held by the picker approaches the center position, the picker does not move relative to the garage, but the picker and the garage move relatively in the horizontal direction so as to be aligned with each other.

According to a sixth aspect of the present invention, in the cassette insertion control method according to the third aspect, in at least one of the first step of moving the picker in the horizontal direction such that the center axis approaches the target stop position deviated from the center position of the front opening part of the garage and the sixth step of moving the picker in the horizontal direction such that the cassette held by the picker approaches the center position, the picker does not move relative to the garage, but the picker and the garage move relatively in the horizontal direction so as to be aligned with each other.

According to a seventh aspect of the present invention, there is provided a cassette library device configured to execute the cassette insertion control method according to any one of the first to sixth aspects.

With this configuration, even when the garage cannot approach the picker although the picker moves, the picker and the garage can be made close to each other.

EFFECT OF THE INVENTION

According to the present invention, in a cassette library device, even when a picker stops while being misaligned with a garage due to low accuracy of a stop position of the picker or the garage, a cassette can be securely stored in the garage by means of the picker.

BEST MODE FOR CARRYING OUT THE INVENTION

Hereinafter, description will be given of a cassette insertion control method according to the present invention based on specific embodiments.

Embodiment 1

Figure 1:
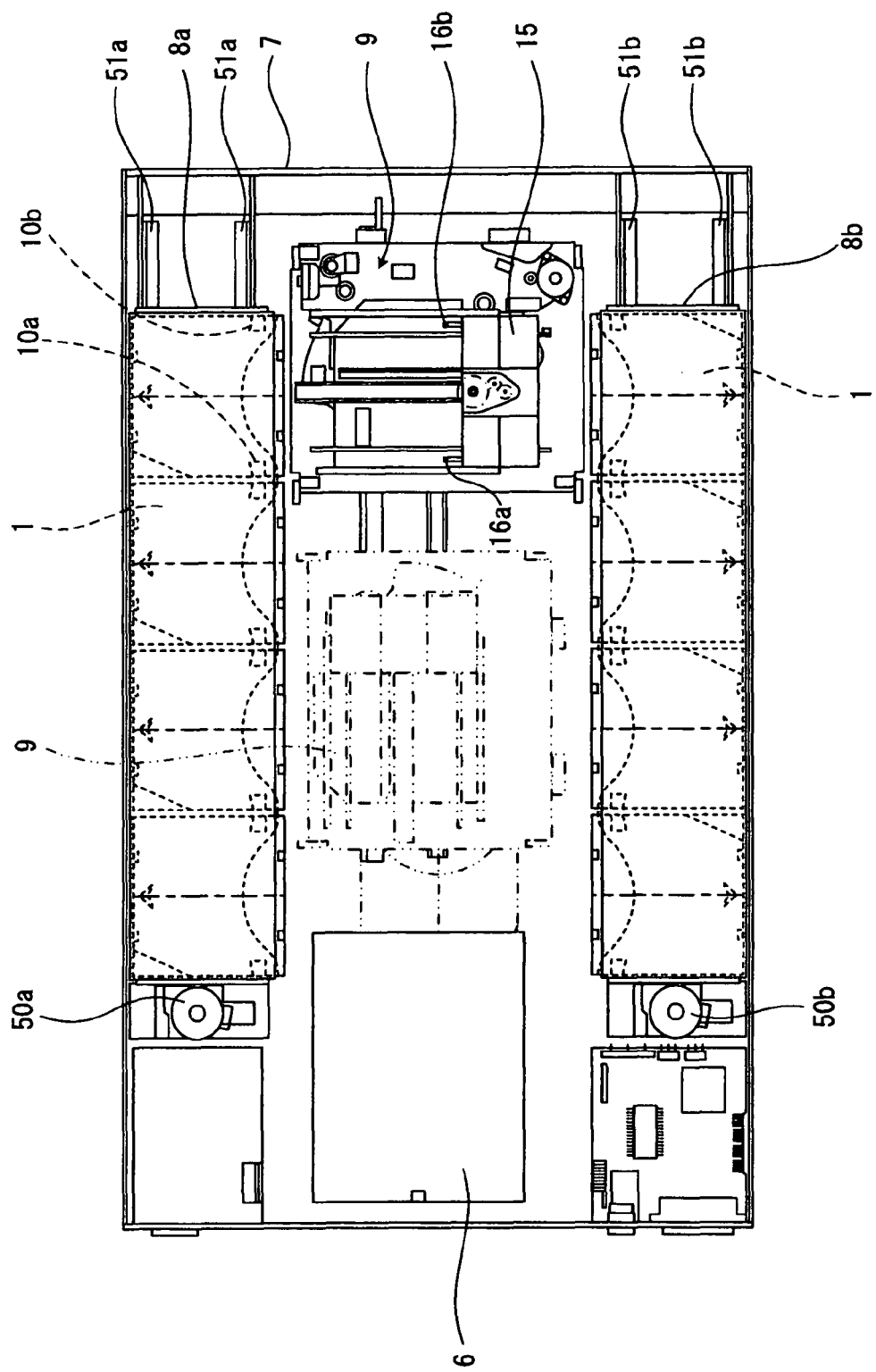
FIG. 1 is a plan view illustrating a general configuration of a cassette library device executing a cassette insertion control method in Embodiment 1 of the present invention.
Figure 2:
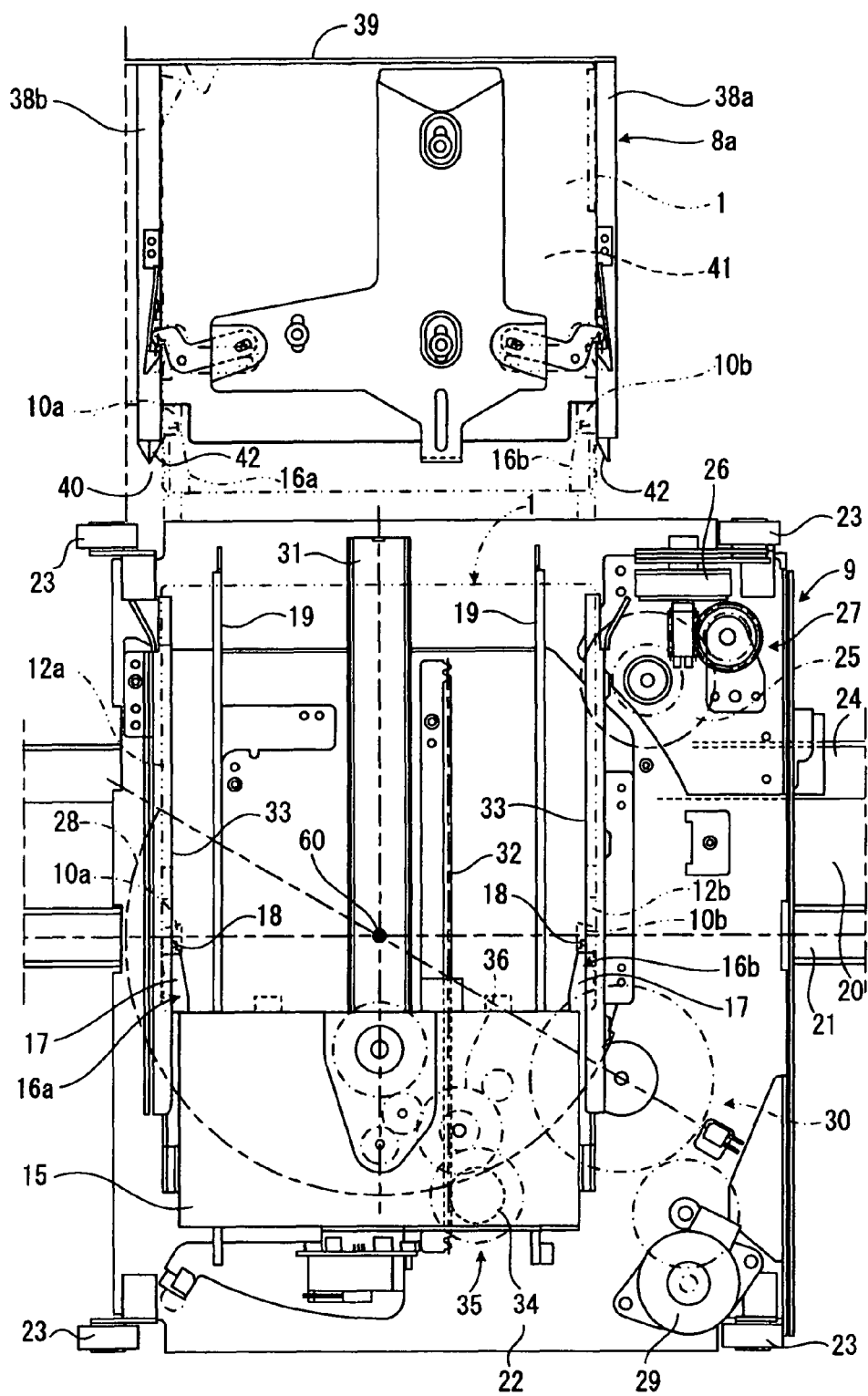
FIG. 2 is an enlarged view specifically illustrating main components in Embodiment 1.

FIG. 1 is a plan view illustrating a cassette library device configured to execute a cassette insertion control method according to the present invention. FIG. 2 is an enlarged view specifically illustrating main components illustrated in FIG. 1.

Figure 16:
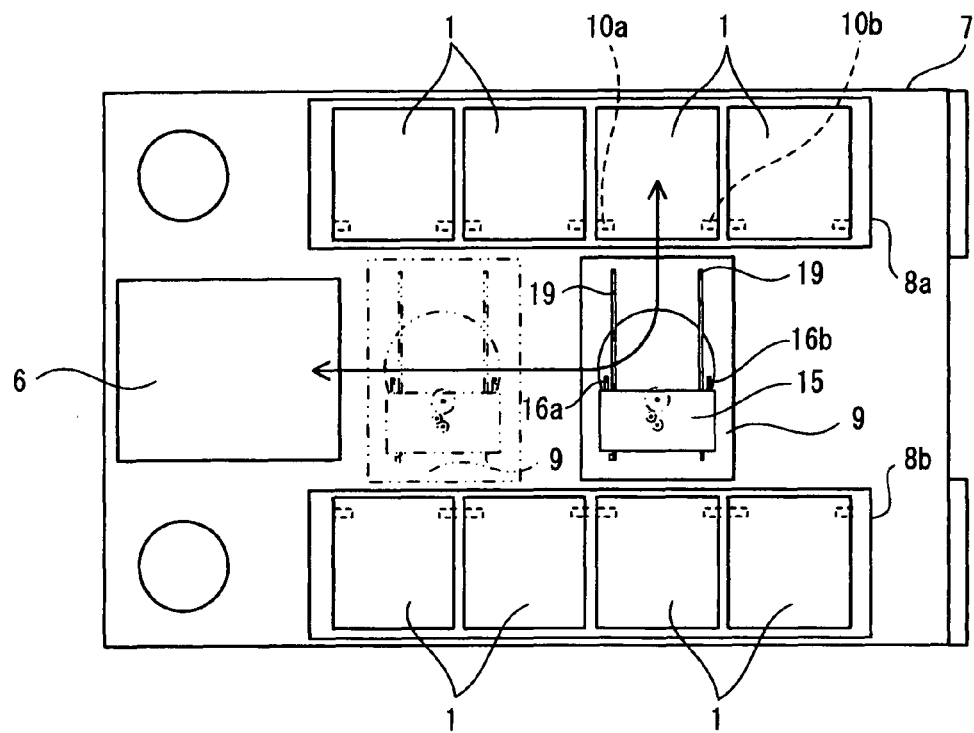
FIG. 16 schematically illustrates another conventional cassette library device.
Figure 17A:
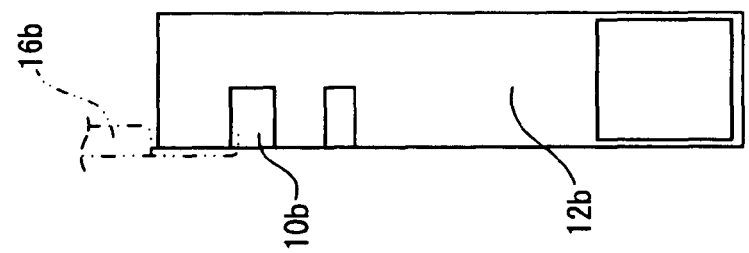
FIGS. 17(a) to 17(c) schematically illustrate a cassette in the device illustrated in FIG. 16.
Figure 17B:
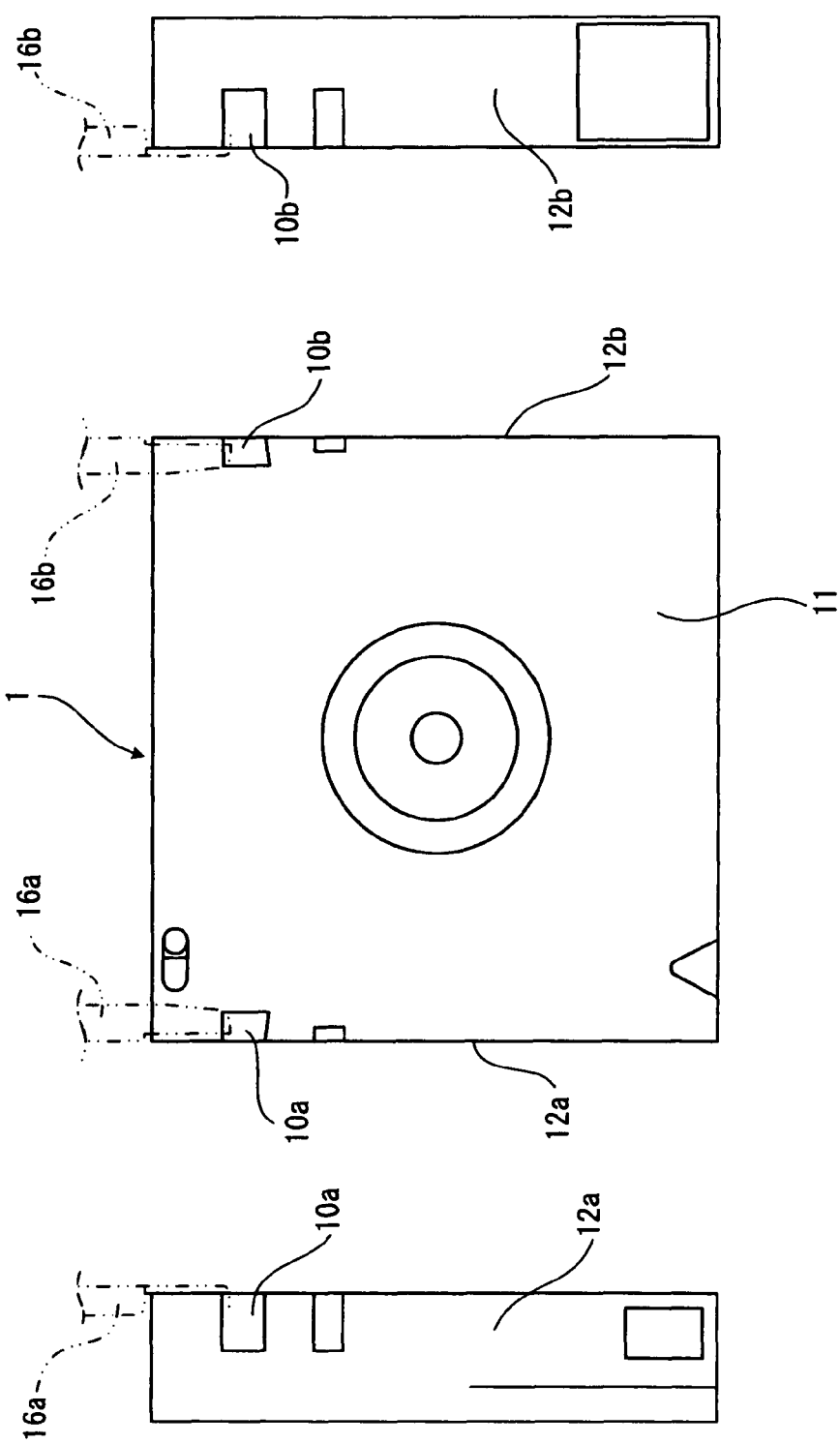
Figure 17C:
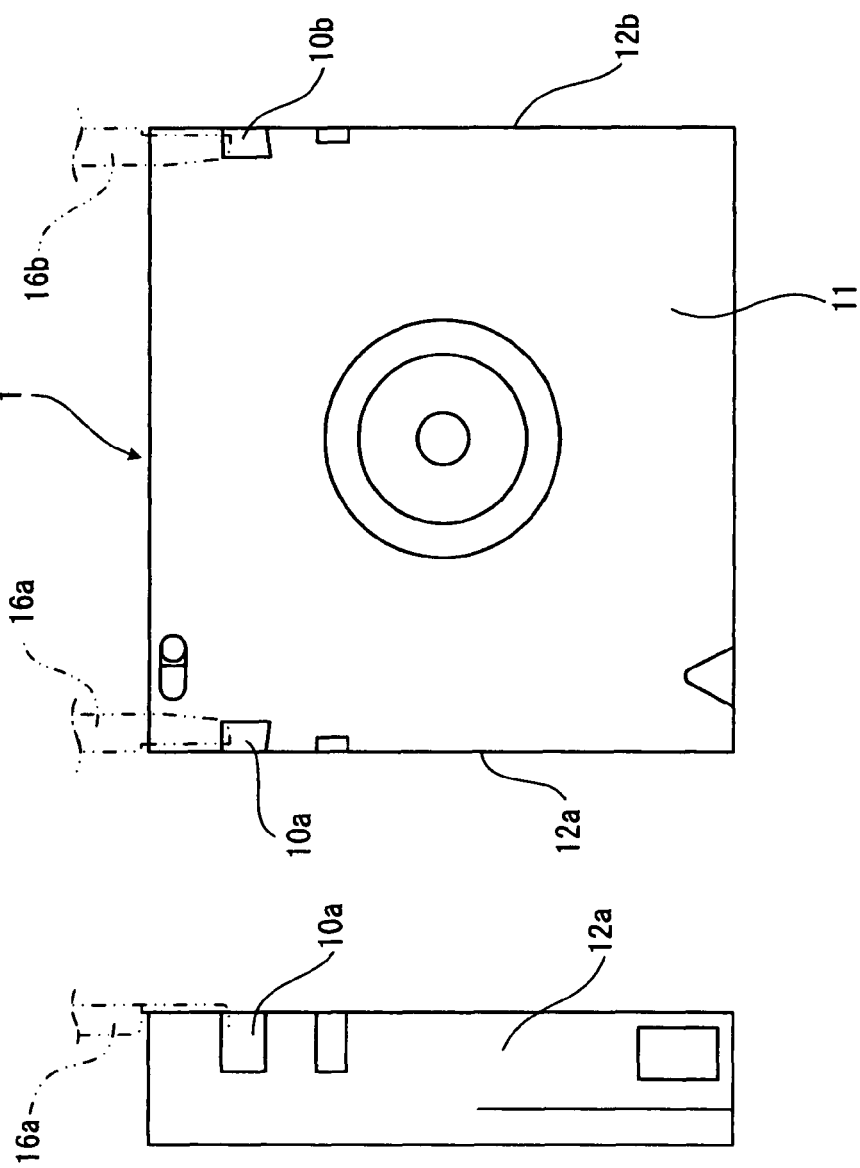
Figure 18:
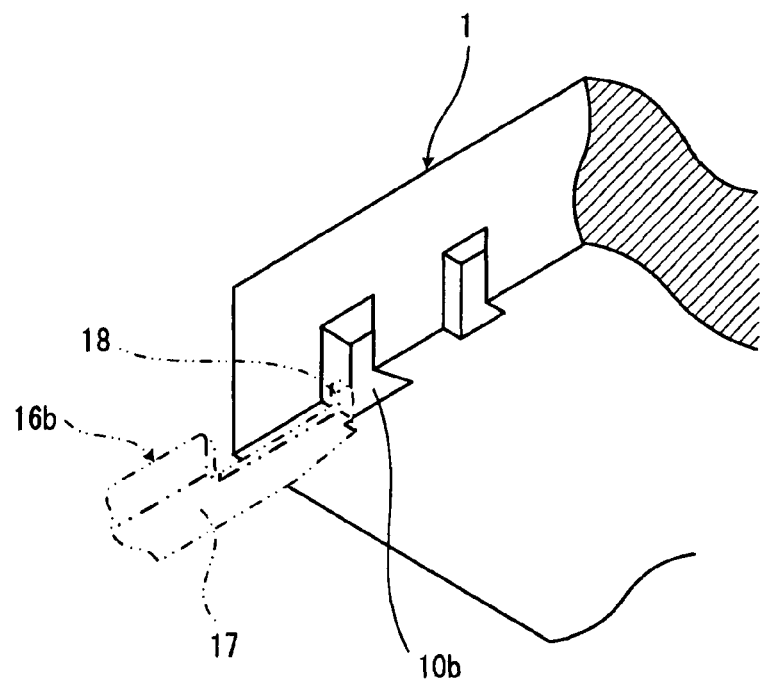
FIG. 18 is a perspective view illustrating main parts of the cassette illustrated in FIGS. 17(a) to 17(c).
Figure 19:
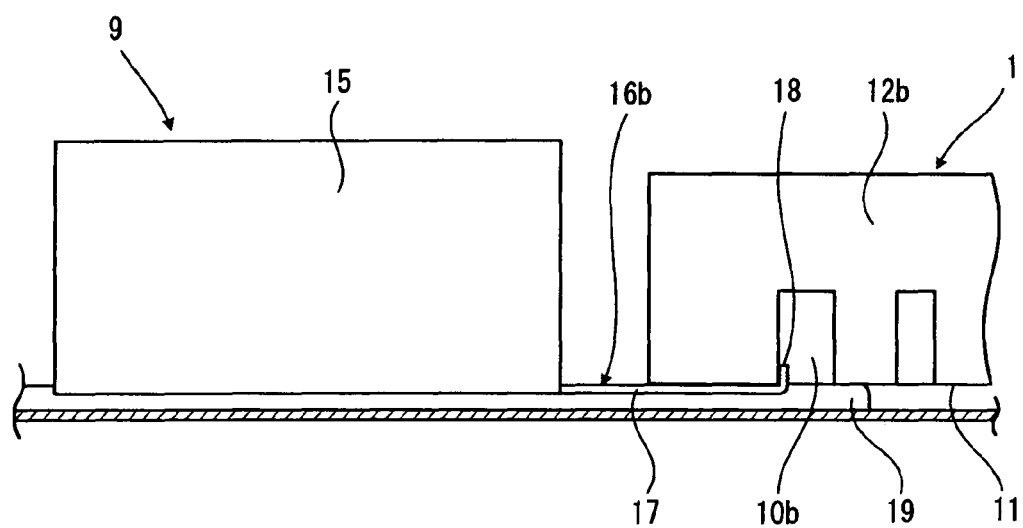
FIG. 19 illustrates a state that a picker takes out the cassette illustrated in FIGS. 17(a) to 17(c).

The cassette library device is of a magazine type, which is similar to a conventional cassette library device illustrated in FIG. 16. As illustrated in FIG. 1, the cassette library device mainly comprises a casing 7, garages 8a and 8b, a cassette 1, a picker 9, and a tape drive 6.

The cassette 1 is stored in the garage 8a (8b) such that recesses 10a and 10b thereof are located at an open side of the garage 8a (8b), that is, the recesses 10a and 10b are located near the picker 9.

As illustrated in FIGS. 1 and 2, the picker 9 can run on a space defined between the garages 8a and 8b in a direction parallel with an arranged direction of the garages 8a and 8b. More specifically, a guide rail 21 extending in the direction parallel with the arranged direction of the garages 8a and 8b is provided on a base 20 between the garages 8a and 8b, and a horizontal, plate-shaped frame 22 in the picker 9 can run while being guided by the guide rail 21.

The frame 22 has wheels 23 for running. The base 20 has a rack 24 extending parallel with the guide rail 21. The frame 22 has a pinion 25 engaged with the rack 24. The pinion 25 receives, through a worm gear mechanism 27, a rotating force from a stepping motor 26 provided as a driving source in the frame 22. Thus, the picker 9 can run freely while being guided by the guide rail 21. The worm gear mechanism 27 also serves as a brake for stopping the picker 9 based on a rotation prevention mechanism thereof.

The garages 8a and 8b can run in the direction parallel with the arranged direction of the garages 8a and 8b. Guide rails 51a and 51b each extending in the direction parallel with the arranged direction of the garages 8a and 8b are provided below the garages 8a and 8b, respectively. The garages 8a and 8b can run while being guided by the guide rails 51a and 51b. The garages 8a and 8b receive rotating forces from stepping motors 50a and 50b each serving as a driving source, through racks, pinions, gears and belts (not illustrated), respectively. Thus, the garages 8a and 8b can run freely while being guided by the guide rails 51a and 51b, respectively.

A horizontal, plate-shaped gear 28 having a large diameter is provided on the frame 22 to configure a turn table. The gear 28 has meshing teeth formed approximately halfway therearound. A stepping motor 29 serving as a driving source for rotating the gear 28 is interlocked with the gear 28 through a deceleration gear mechanism 30. The deceleration gear mechanism 30 has a large gear ratio in order to slowly rotate the gear 28 configuring the turn table. It is assumed herein that the deceleration gear mechanism 30 is, for example, a super gear. Upon application of an external rotating force to the gear 28 serving as the turn table, the deceleration gear mechanism 30 can permit the rotation of the gear 28.

More specifically, in the cassette library device having the configuration that the casing 7, formed into a box shape as illustrated in FIG. 1, houses components, the picker 9 moves in a direction parallel with a longer side of the casing 7 and the movable unit 15 moves in a direction parallel with a shorter side of the casing 7, the moving direction of the picker 9 and that of the movable unit 15 are readily susceptible to an influence of disturbance vibration. Therefore, it is necessary for the moving direction of the picker 9 and that of the movable unit 15 to increase a braking force by means of the worm gear mechanism 27 and the like as described above, thereby to overcome the influence of the disturbance vibration. However, since the rotating direction of the gear 28 serving as a turn table is hardly susceptible to the influence of the disturbance vibration, the braking force may be small. Hence, even when the rotation of the gear 28 upon reception of an external rotating force is permissible, there arise no problems.

A pair of guide rails 19 and 19, a guide rail 31, a rack 32 and a floating prevention guide 33 are provided on the gear 28 in a single direction, that is, in a direction parallel with one another. Herein, the guide rail 31 and the rack 32 are formed between the pair of guide rails 19 and 19 so as to be lower in position than the pair of guide rails 19 and 19. The floating prevention guide 33 can be engaged with an upper edge part of the cassette 1 supported by the pair of guide rails 19 and 19, thereby to prevent the cassette 1 from floating.

The movable unit 15 having the rocking arms 16a and 16b can move along the guide rail 31. When the guide rail 31 is directed to a direction perpendicular to the guide rail 21 by the rotation of the gear 28, the movable unit 15 can approach the garage 8a (8b) or can move so as to be away from the garage 8a (8b).

For these movements, the movable unit 15 includes a pinion 34 engaged with the rack 32, and a stepping motor 36 serving as a driving source in order to rotate the pinion 34 at a predetermined speed through a deceleration gear mechanism 35.

Figure 3:
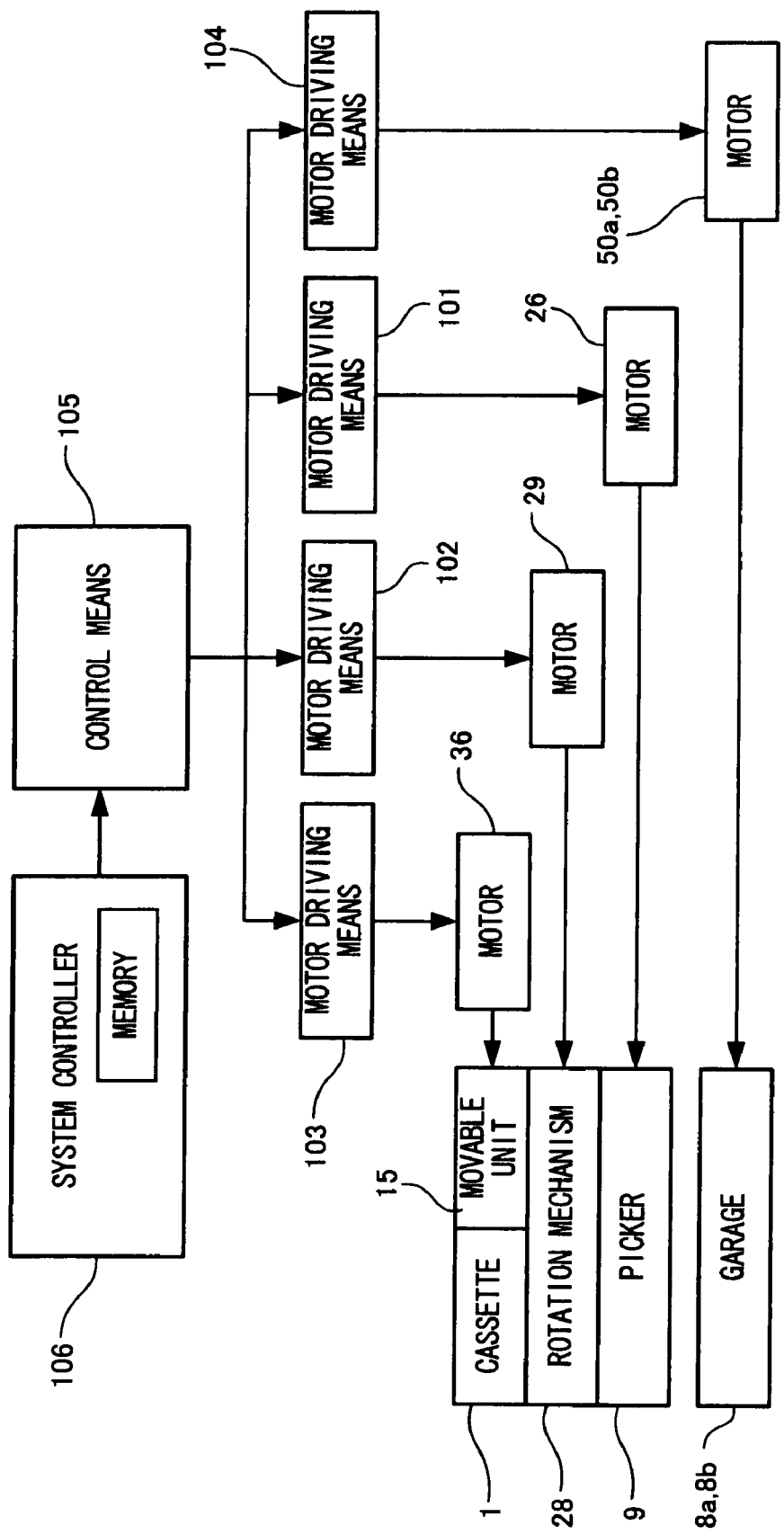
FIG. 3 is a block diagram illustrating the cassette library device in Embodiment 1.

As illustrated in FIG. 3, the stepping motor 26 is driven by a motor driving means 101. The stepping motor 29 is driven by a motor driving means 102. The stepping motor 36 is driven by a motor driving means 103. Each of the stepping motors 50a and 50b is driven by a motor driving means 104.

The motor driving means 101, the motor driving means 102, the motor driving means 103 and the motor driving means 104 are controlled by a control means 105. The control means 105 is controlled by a system controller 106 including a memory.

Thus, the system controller 106 can control the stepping motors 26, 29, 36, 50a and 50b through the control means 105. Further, this control makes it possible to control movement or rotation of the picker 9, the gear 28, the movable unit 15 and garages 8a and 8b.

As illustrated in FIG. 2, a storage section for each cassette 1 in the garage 8a (8b) includes a bottom plate (not illustrated), a pair of side plates 38a and 38b, a rear plate 39, and a top plate (not illustrated), and serves as a horizontal, rectangular parallelepiped-shaped storage section 41 having a front opening part 40.

A cassette 1 is stored in the garage 8a (8b) such that a tip end face thereof comes into contact with the rear plate 39. The side plates 38a and 38b are provided with inclined faces 42 and 42, respectively. Each of the inclined faces 42 and 42 is formed at a position of the front opening part 40 so as to be open outward and, therefore, guides the cassette 1 to be inserted into the garage 8a (8b).

With this configuration, in a case that a cassette 1 held by the picker 9 is stored in the garage 8a (8b), first, the gear 28 rotates so that the cassette 1 and the movable unit 15 each mounted on the gear 28 are directed to the garage 8a (8b). Herein, if the picker 9 fails to send the cassette 1 to the garage 8a (8b), for example, if the garage 8a (8b), in which the cassette 1 will be stored, is out of a moving range of the picker 9 or if an obstacle exists in front of an opening for sending the cassette 1 to the garage 8a (8b), the garage 8a (8b) moves along the guide rails 51a and 5b toward a position at which the picker 9 can send the cassette 1 to the garage 8a (8b). Next, the picker 9 runs along the guide rail 21 and stops at a position corresponding to the garage 8a (8b), and the worm gear mechanism 27 applies a braking force to the picker 9. Herein, as will be described later, the stop position of the picker 9 may not be strictly precise. If the stop position is precise, the movable unit 15 runs along the guide rail 31 so as to approach the garage 8a (8b). Then, the cassette 1 chucked by the rocking arms 16a and 16b slides on the guide rail 19 and, then, is pushed into a predetermined storage section 41 of the garage 8a (8b) through the front opening part 40.

Herein, when the picker 9 stops while being strictly aligned with the garage 8a (8b), the cassette 1 can be pushed into the storage section 41 without fail.

When the movable unit 15 is directed to a direction that the movable unit 15 can run toward the garage 8a (8b), a play is provided between the recesses 10a and 10b of the cassette 1 and the tip ends 18 and 18 of the rocking arms 16a and 16b, respectively, in the running direction of the picker 9. In a case that the picker 9 stops while being slightly misaligned with the garage 8a (8b) within a range of the play, when the movable unit 15 allows the cassette 1 to approach the garage 8a (8b), a tip corner part of the cassette 1 comes into contact with the inclined face 42 of the side plate 38a (38b) of the garage 8a (8b). Thus, the cassette 1 is guided by the inclined face 42, and is centered on the storage section 41 of the garage 8a (8b) within the range of the play. In this centered state, the cassette 1 is pushed into and stored in the storage section 41.

However, in a case that the picker 9 stops while being misaligned with the garage 8a (8b), when the movable unit 15 allows the cassette 1 to approach the garage 8a (8b), a garage-side face of the cassette 1 collides with the side plate 38a (38b) of the garage 8a (8b). Thus, the cassette 1 is hindered from moving toward the garage 8a (8b). Consequently, the cassette 1 cannot be pushed into the storage section 41.

Figure 8:
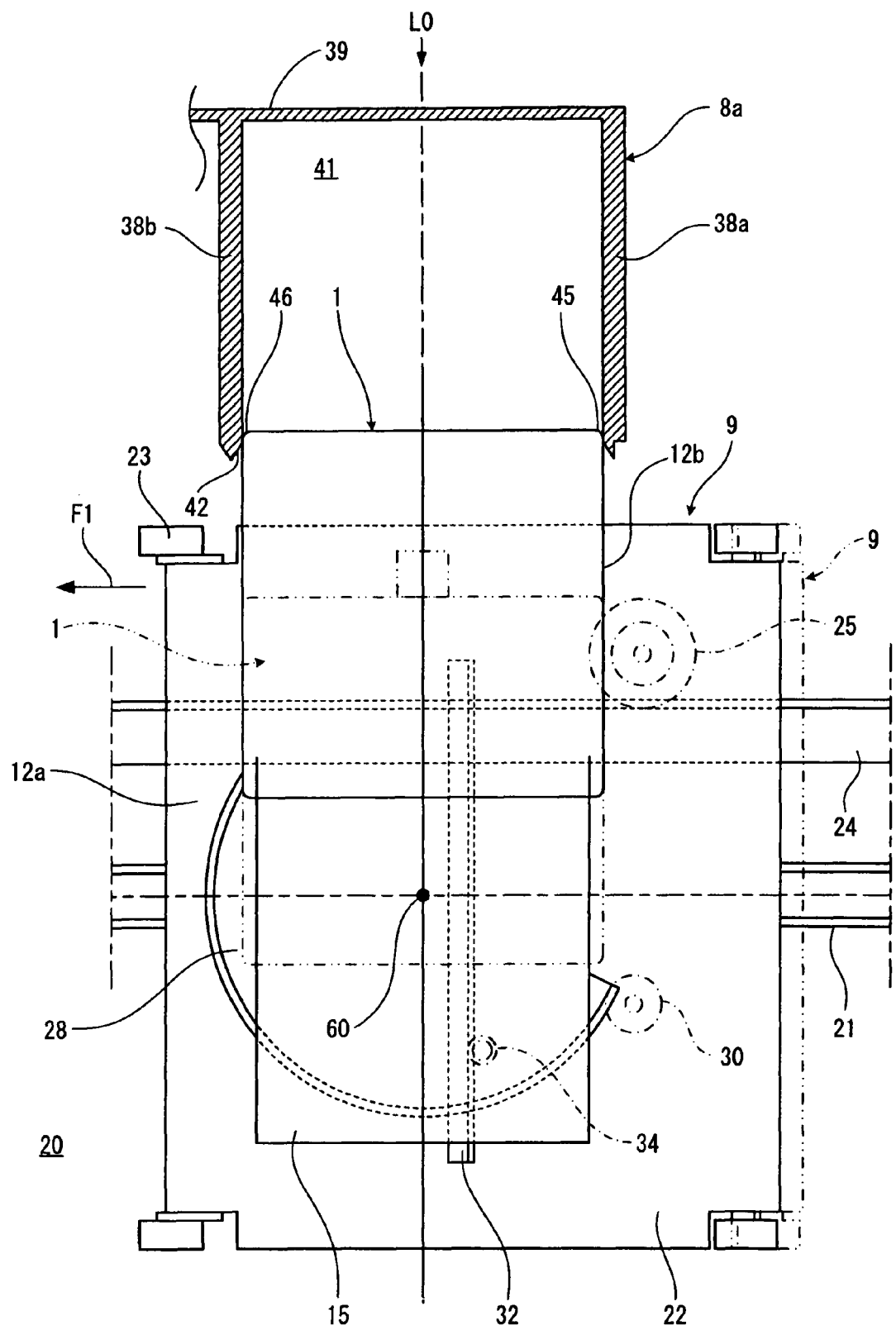
FIG. 8 illustrates a state that a picker moves in the cassette library device.
Figure 9:
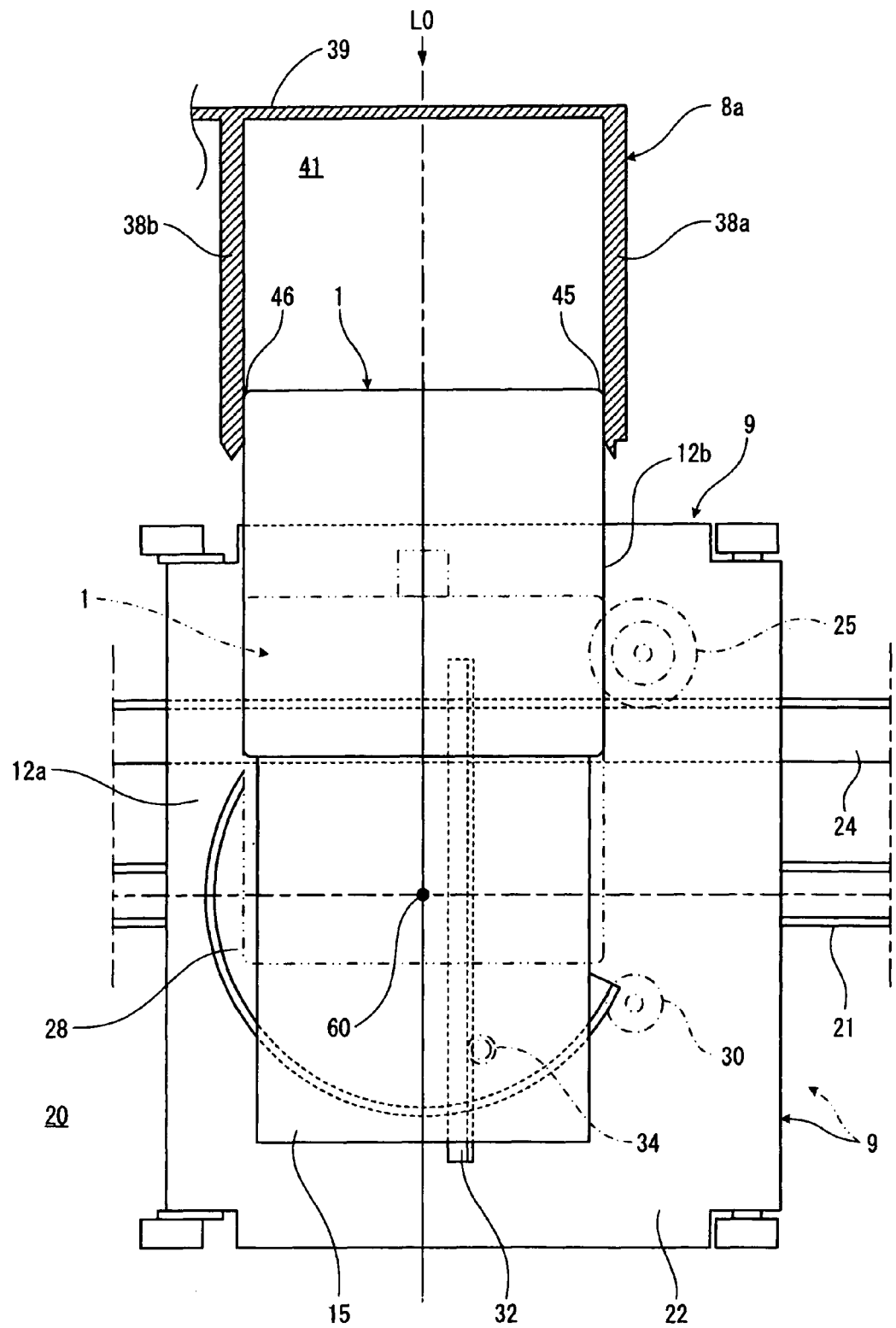
FIG. 9 illustrates a state that a cassette is pushed out toward a storage section in the cassette library device.
Figure 10:
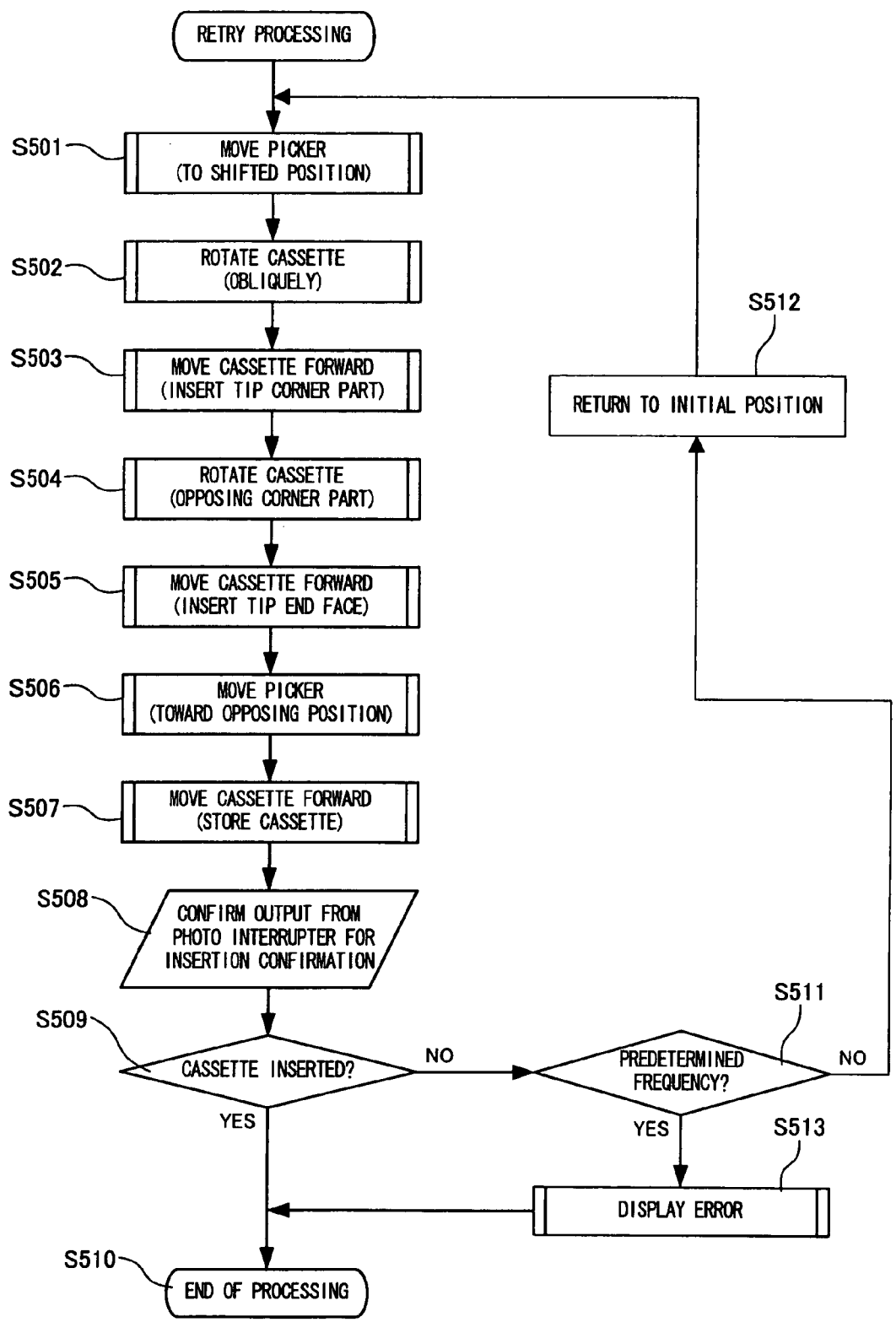
FIG. 10 is a control flowchart showing actions of the cassette library device.

In order to prevent this disadvantage, according to this embodiment, retry processing illustrated in FIGS. 4 to 9 is performed instead of the method described above with reference to FIGS. 1 and 2, so that the cassette 1 is stored in the storage section 41. FIG. 10 shows a processing routine for the retry processing performed by the system controller 106.

Figure 4:
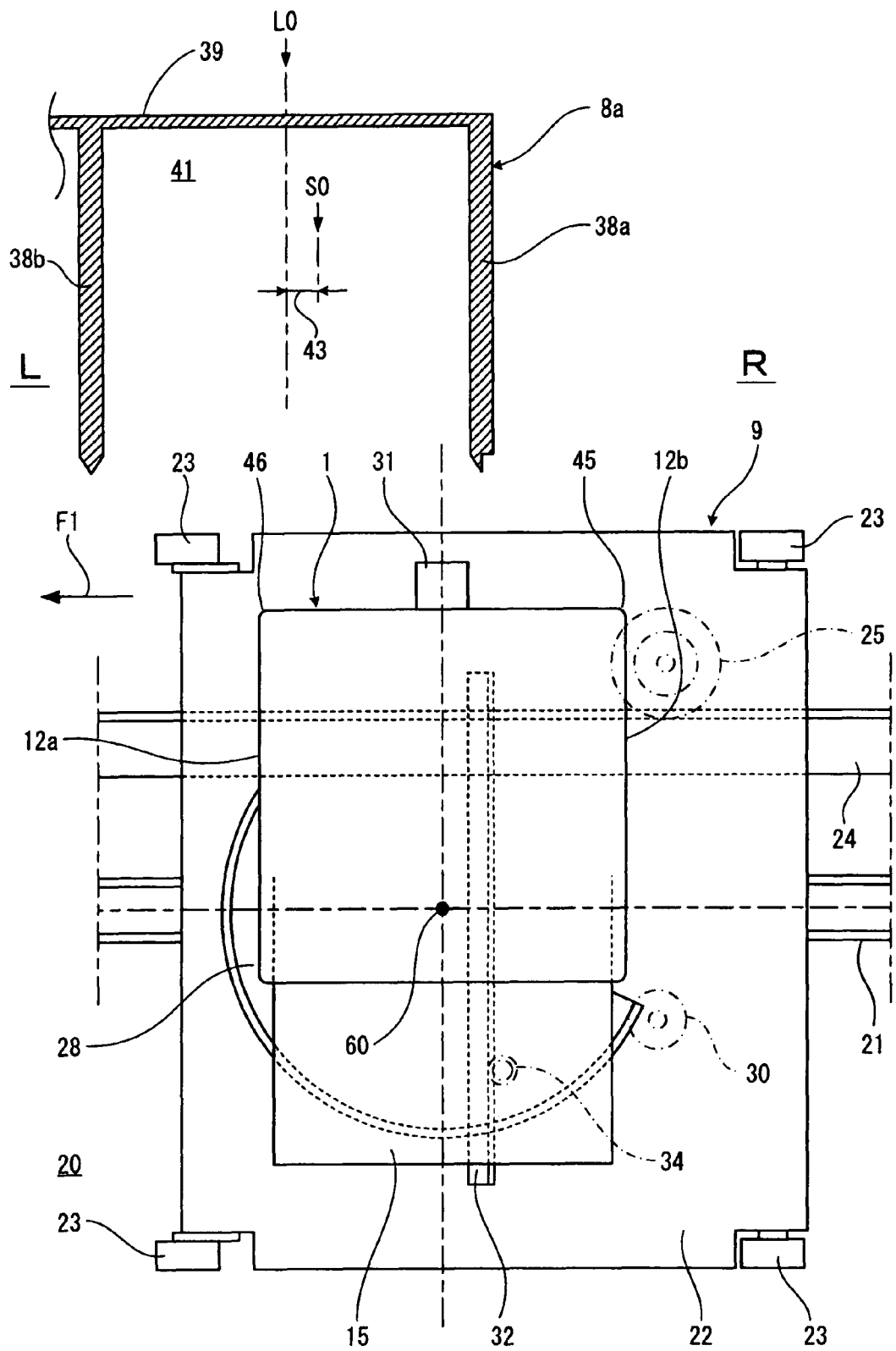
FIG. 4 illustrates an initial state of the cassette library device in a case that a cassette is stored in a storage section of a garage.

Herein, description will be given of, as an example, a retry processing start status that, as illustrated in FIG. 4, the picker 9 moves in a direction shown by an arrow F1 from right (R) to left (L) upon performance of the retry processing, thereby to approach a target storage section 41 of the garage 8a.

Figure 5:
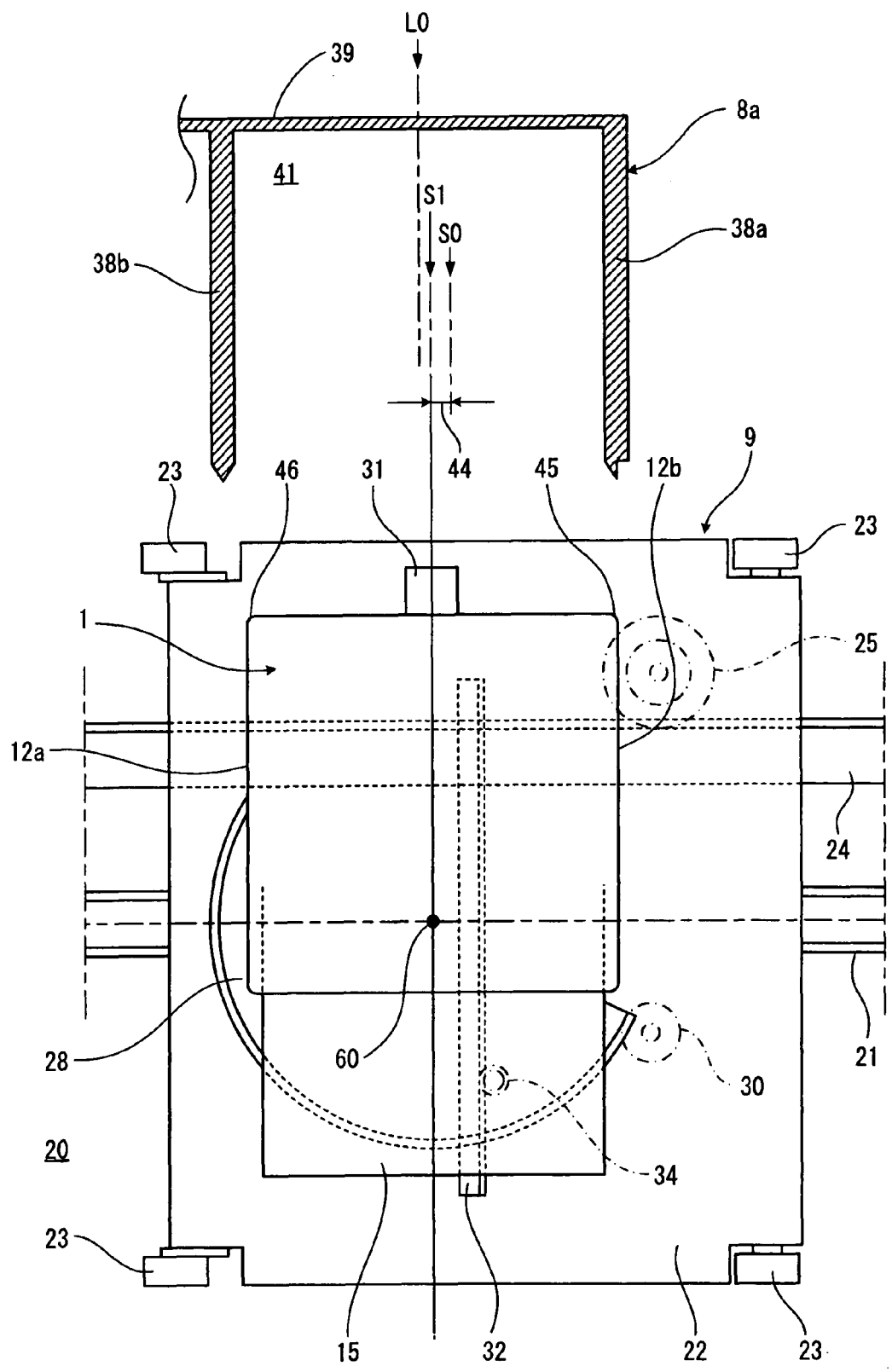
FIG. 5 illustrates a state that a cassette stops beyond a center position of a storage section in the cassette library device.

In step S501 shown in FIG. 10, first, the stepping motor 26 allows the picker 9 to move in the direction shown by the arrow F1 toward a target stop position S0 spaced away from a center position L0 of the storage section 41 of the garage 8a by a distance 43 as illustrated in FIGS. 4 and 5.

Figure 6:
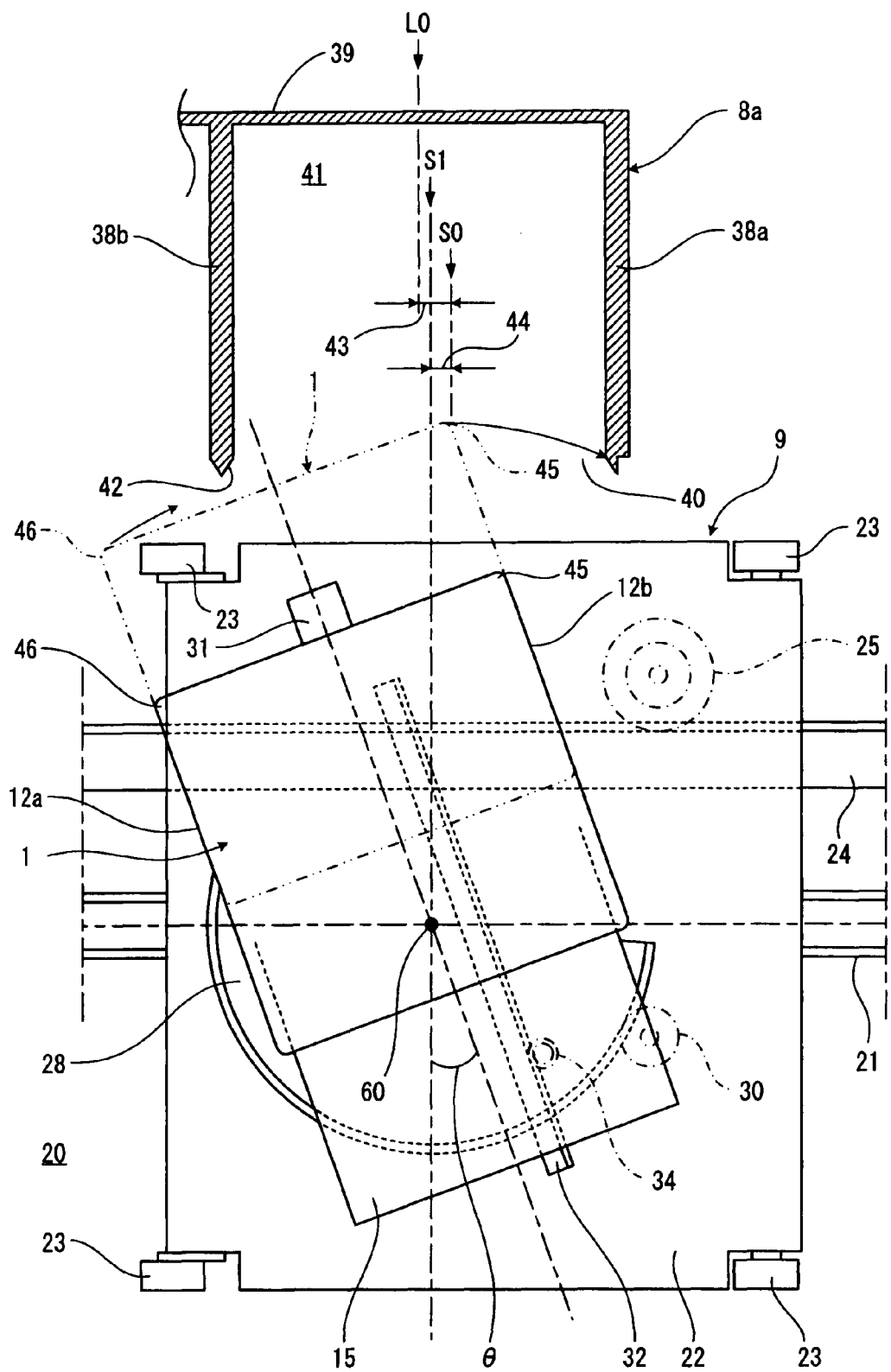
FIG. 6 illustrates a state that a cassette is rotated in a counterclockwise direction in the cassette library device.

It is assumed herein that, in step S501, the picker 9 receives a braking force in order to stop at the target stop position S0, but passes by the target stop position S0 by a distance 44 and stops at a position S1 as illustrated in FIG. 6.

As for the retry processing on an assumption that the picker 9 stops at a position S2 in front of the target stop position S0 by a distance 44 (see FIG. 11) by performance of step S501, the cassette 1 can be stored in the storage section 41 by performance of the processing routine shown in FIG. 10. This will be described later.

In step S502, the stepping motor 29 rotates the gear 28 in the state illustrated in FIG. 5, so that the cassette 1 rotates about a vertical center axis 60 in a counterclockwise direction by a predetermined angle θ as illustrated in FIG. 6.

In step S503, the stepping motor 36 rotates, so that the cassette 1 is pushed out toward a position shown by an imaginary line in FIG. 6. Thus, the cassette 1 approaches the storage section 41, and a right tip corner part 45 of the cassette 1 tilted with respect to the storage section 41 of the garage 8a enters the storage section 41 through the front opening part 40 of the garage 8a.

Figure 7:
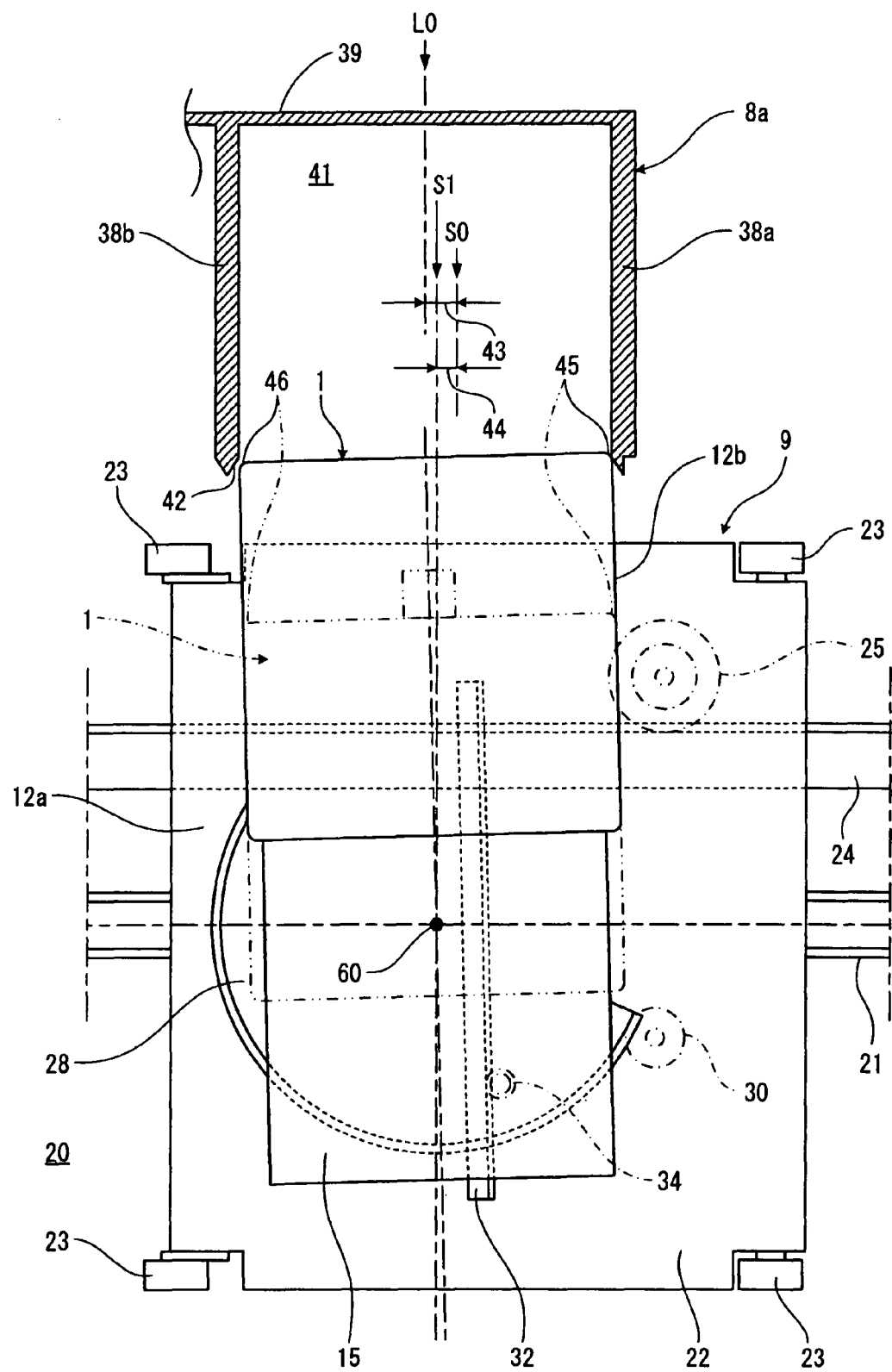
FIG. 7 illustrates a state that a cassette is rotated in a clockwise direction in the cassette library device.

In step S504, the stepping motor 29 rotates the gear 28, so that the cassette 1 rotates about the center axis 60 in a clockwise direction. Thus, the corner part 45 of the cassette 1 is brought into contact with the side plate 38a of the garage 8a as illustrated in FIG. 7. When the corner part 45 of the cassette 1 comes into contact with the side plate 38a, a reaction force generated by this contact stops the rotation of the rotation mechanism 28. In the state illustrated in FIG. 7, a left tip corner part 46 of the cassette 1 slightly enters the front opening part 40 of the garage 8a and is located near the side plate 38b of the garage 8a.

In step S505, the stepping motor 36 rotates, so that the cassette 1 is slightly pushed out along the guide rail 31 as illustrated in FIG. 8. Effectiveness of step S505 becomes obvious in a case illustrated in FIG. 11 (to be described later).

Thus, the corner part 46 of the cassette 1 comes into contact with the inclined face 42 formed at the tip end of the sideplate 38b, and is guided by the inclined face 42. As a result, the corner parts 45 and 46 of the cassette 1 further enter the storage section 41.

In step S506, the stepping motor 26 moves the picker 9 in the direction shown by the arrow F1 by the distance 43, so that the cassette 1 comes into contact with the side plate 38b. Then, a reaction force is acted on the cassette 1 from the side plate 38b of the garage 8a. This reaction force is acted on the cassette 1 and the movable unit 15, so that the cassette 1, the movable unit 15 and the gear 28 serving as a turn table for supporting the cassette 1 and the movable unit 15 overcome the small braking forces generated by the stepping motor 29 and the deceleration gear mechanism 30. Thus, the cassette 1, the movable unit 15 and the gear 28 move in the rotating direction.

Thus, as for the cassette 1, the posture in the slanting direction (the state illustrated in FIG. 7) is corrected to a posture directed toward the center of the storage section 41.

In step S507, subsequently, the stepping motor 36 rotates, so that the cassette 1 is pushed out toward the storage section 41 along the guide rail 31. Thus, the cassette 1 is straightly pushed into and stored in the storage section 41 as illustrated in FIG. 9.

With this correction, even when a deviation 44 from a target stop position occurs upon stop of the picker 9 and garage 8a due to low stop accuracy of the picker 9 or the garage 8a, the cassette 1 can be securely stored in the storage section 41.

In step S508, the system controller 106 reads an output from a photointerrupter for insertion confirmation (not illustrated) in order to detect that the cassette 1 is stored in a specified position of the storage section 41.

In step S509, the system controller 109 determines whether or not the action for storing the cassette 1 in the storage section 41 is completed, based on details of the output read in step S508. If it is determined that the action for storing the cassette 1 in the storage section 41 is completed, the retry processing is finished in step S510.

On the other hand, if it is determined that the action for storing the cassette 1 in the storage section 41 cannot be completed, the system controller 106 checks a frequency of the retry processing in step S511. If the checked frequency is less than a predetermined frequency, the system controller 106 performs an action in S512 in order to perform the action in S501 again.

If it is determined that the checked frequency reaches the predetermined frequency in step S511, the system controller 106 displays an error in step S513 and, then, terminates the retry processing in step S510.

In step S512, the movable unit 15 returns onto the picker 9, and the picker 9 retreats to the initial position.

Figure 11:
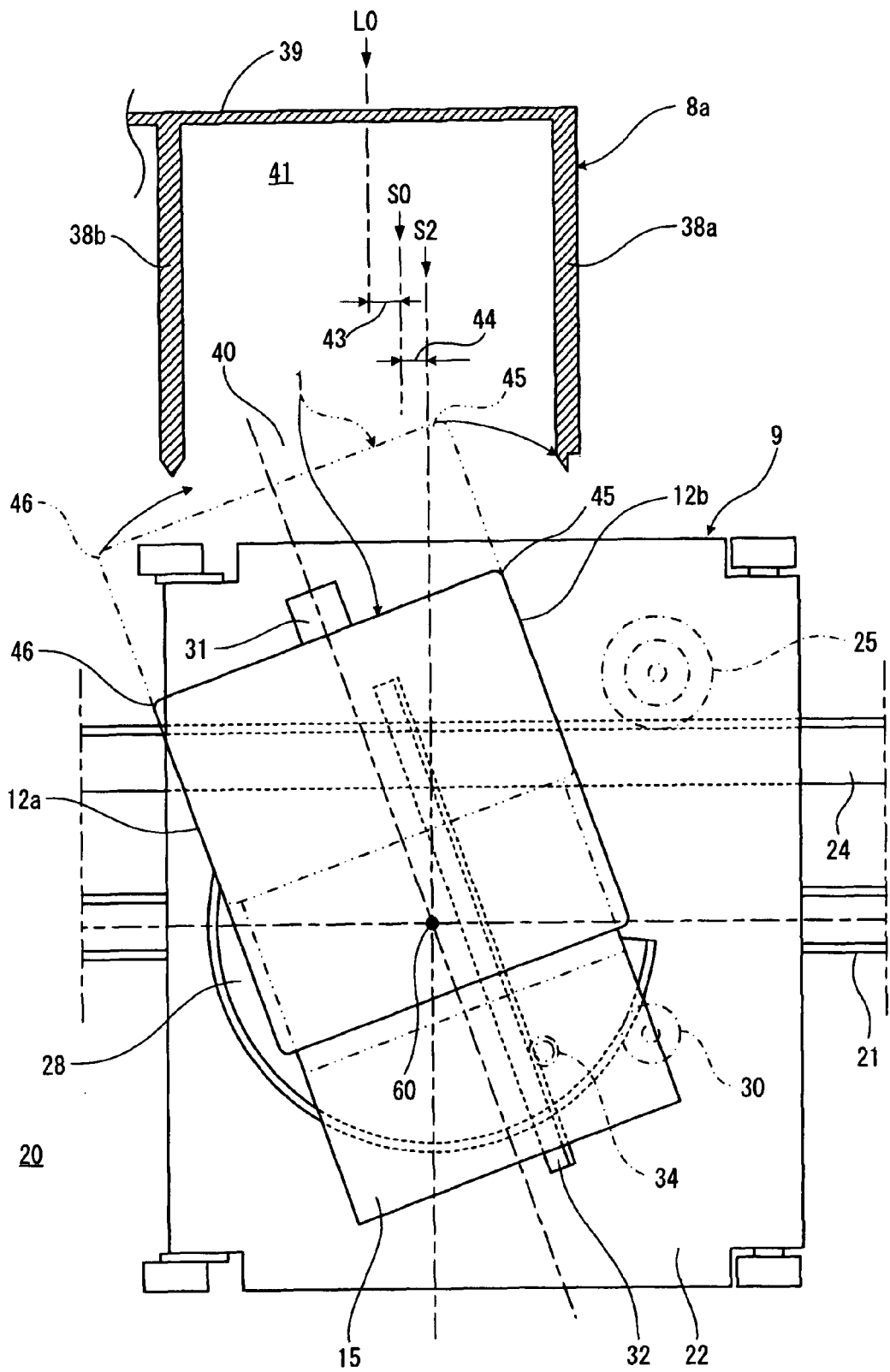
FIG. 11 illustrates a state that a cassette stops in front of a center position of a storage section in the cassette library device.
Figure 12:
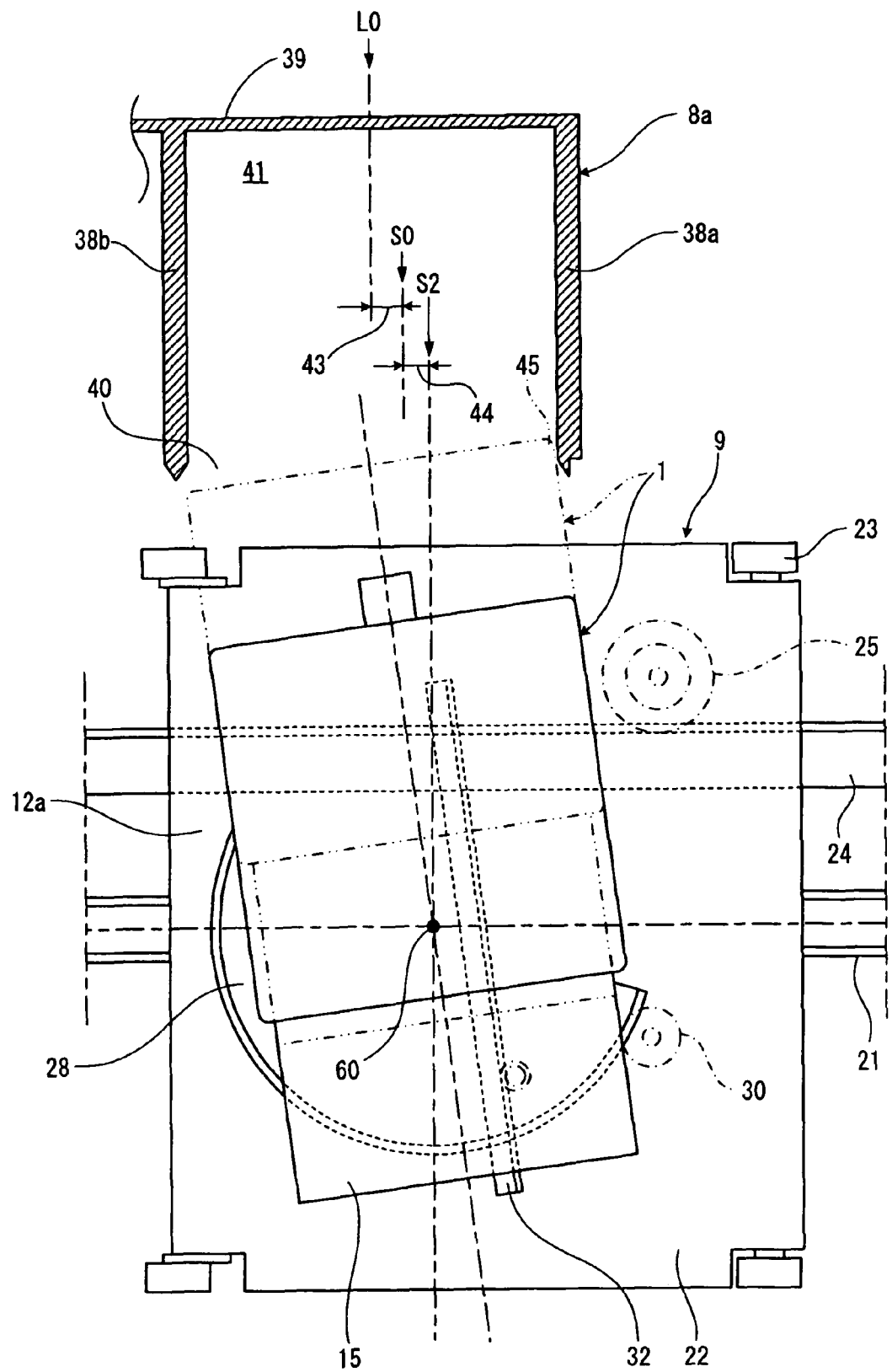
FIG. 12 illustrates a state that a cassette is rotated in a counterclockwise direction, is pushed out toward a storage section and is rotated in a clockwise direction in the cassette library device.
Figure 13:
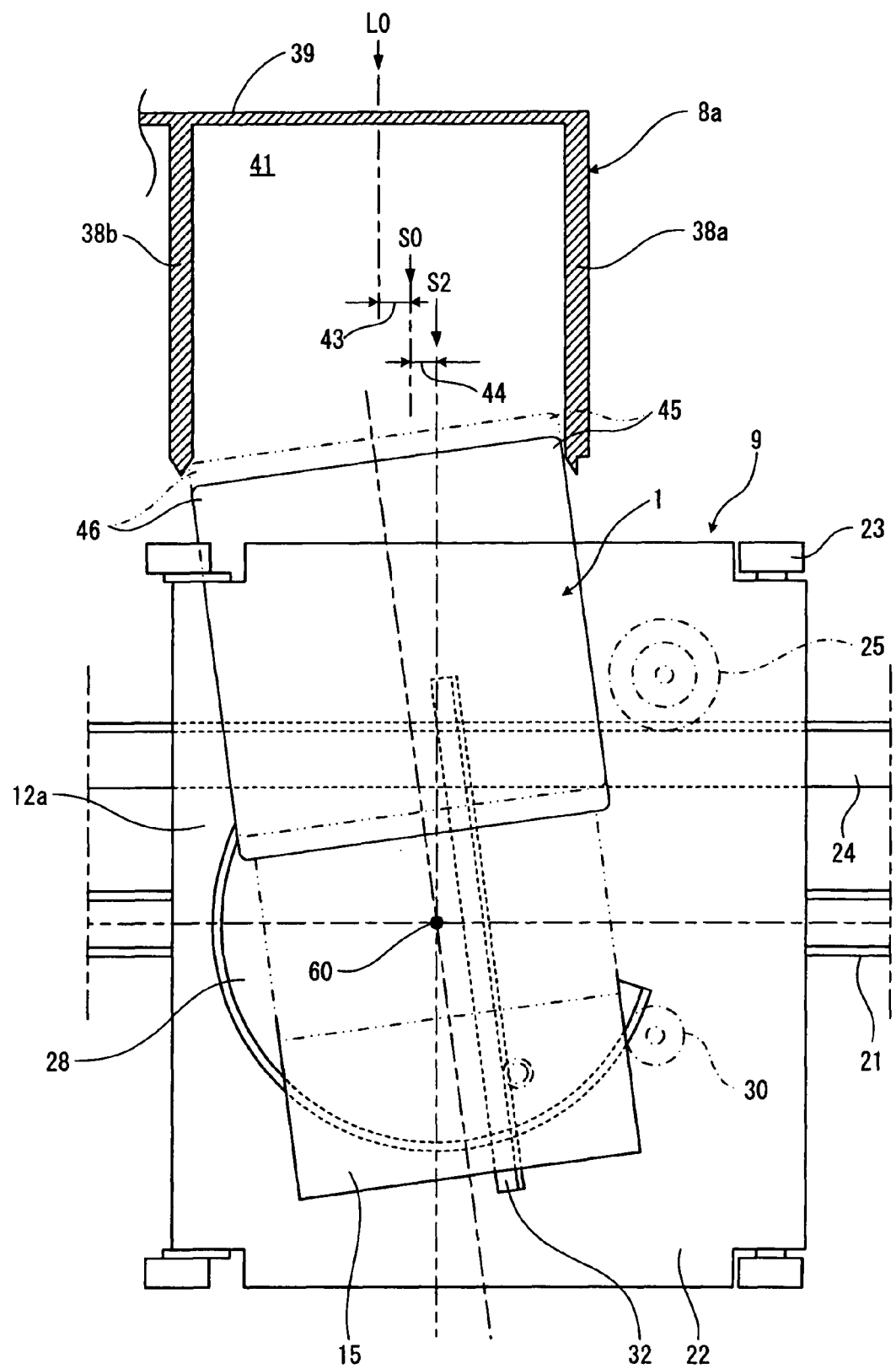
FIG. 13 illustrates a state that a cassette is further pushed out toward a storage section in the cassette library device.

In the retry processing that, in step S501, the picker 9 stops at the position S2 in front of the target stop position S0 by the distance 44 as illustrated in FIG. 11, the stepping motor 29 rotates the gear 28, so that the cassette 1 rotates about the center axis 60 in the clockwise direction in step S504 by way of step S503. In the state that the tip corner part 45 of the cassette 1 comes into contact with the side plate 38a of the garage 8a as shown by an imaginary line in FIG. 12, the tip corner part 46 of the cassette 1 is prevented from entering the front opening part 40 of the garage 8a. However, when the cassette 1 is further pushed out slightly in step S505, the tip corner part 46 of the cassette 1 can reach the position near the side plate 38b of the garage 8a as illustrated in FIG. 13. Further, the tip corner part 46 of the cassette 1 comes into contact with the inclined face 42 formed at the tip end of the side plate 38b in step S507 by way of step S506. The tip corner part 46 is guided by the inclined face 42, so that both the tip corner parts 45 and 46 of the cassette 1 further enter the storage section 41. By performance of the action in step S505, it can be expected that the retry processing is normally performed even in the aforementioned case.

Embodiment 2

Figure 14:
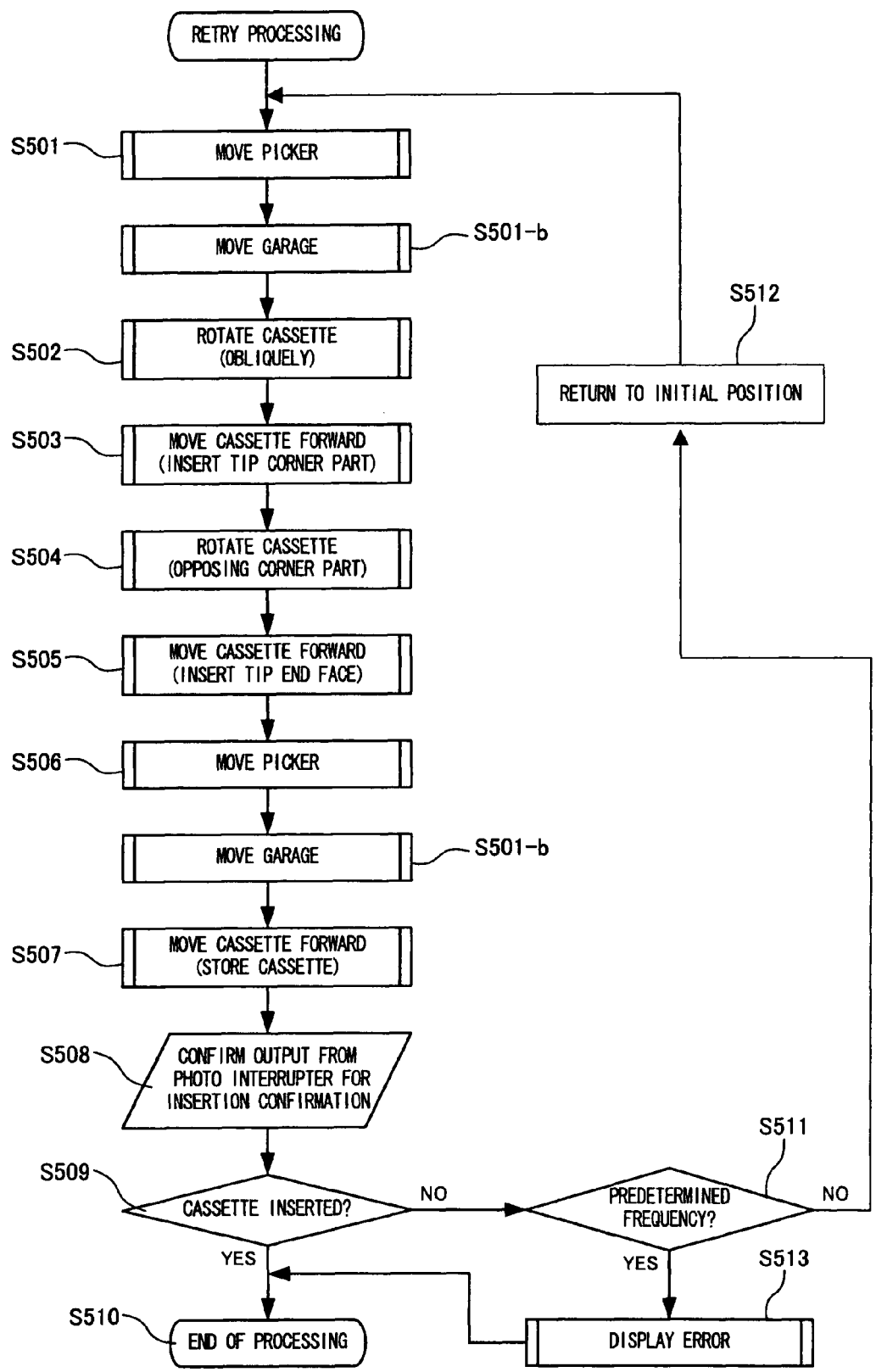
FIG. 14 is a control flowchart showing actions of a cassette library device executing a cassette insertion control method in Embodiment 2 of the present invention.
Figure 15:
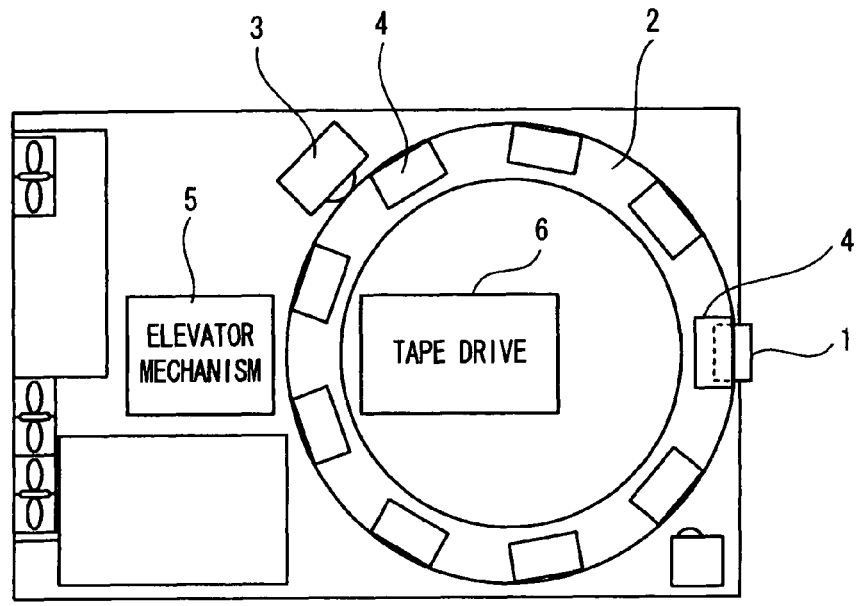
FIG. 15 schematically illustrates a conventional cassette library device.

In Embodiment 1, the picker 9 moves relative to the garage 8a (8b), so that the cassette 1 is stored in the storage section 41. However, the processing routines for the retry processing performed by the system controller 106 and shown in FIG. 10 may be configured as shown in FIG. 14. Specifically, movement amounts of the picker 9 in steps S501 and S506 in FIG. 14 differ from the movement amounts of the picker 9 in steps S501 and S506 in FIG. 10. Further, steps S501-b and S506-b are added to the processing routines shown in FIG. 14. The remaining steps in FIG. 10 are equal to those in FIG. 14.

More specifically, in the processing routine shown in FIG. 10, the picker 9 moves in step S501 and, then, the cassette 1 rotates in step S502. Moreover, the picker 9 moves in step S506 and, then, the cassette 1 moves toward the storage section 41 in step S507. On the other hand, in the processing routine shown in FIG. 14, a combination of step S501 in which the picker 9 moves and step S501-b which is interposed between step S501 and step S502 and in which the garage 8a moves relative to the picker 9 is equivalent to step S501 of the processing routine shown in FIG. 10. Herein, the movement amount of the picker 9 in step S501 of the processing routine shown in FIG. 14 is smaller than the movement amount of the picker 9 in step S501 of the processing routine shown in FIG. 10. In step S501-b, the garage 8a moves relative to the picker 9 so as to make up for the movement of the picker 9, and the cassette 1 held by the picker 9 approaches the target stop position 43 where the center axis 60 about which the cassette 1 rotates in the horizontal direction is deviated from the center position of the front opening part 40 of the garage 8a.

In the processing routine shown in FIG. 14, further, a combination of step S506 in which the picker 9 moves and step S506-b which is interposed between step S506 and step S507 and in which the garage 8a moves relative to the picker 9 is equivalent to step S506 of the processing routine shown in FIG. 10. Herein, the movement amount of the picker 9 in step S506 of the processing routine shown in FIG. 14 is smaller than the movement amount of the picker 9 in step S506 of the processing routine shown in FIG. 10. In step S506-b, the garage 8a moves relative to the picker 9 so as to make up for the movement of the picker 9, and the cassette 1 held by the picker 9 approaches the target stop position 43 where the center axis 60 about which the cassette 1 rotates in the horizontal direction is deviated from the center position of the front opening part 40 of the garage 8a.

Also with this configuration, the cassette 1 can be securely stored in the storage section 41.

Herein, at least one of an order to perform step S501 and step S501-b and an order to perform step S506 and step S506-b may be changed. In accordance with locations of a plurality of storage sections 41 of the garage 8a, the aforementioned orders may be changed, steps S501 and S501-b may be performed concurrently, or steps S506 and S506-b may be performed concurrently.

In other words, the picker 9 does not move relative to the garage 8a, but the picker 9 and the garage 8a move relatively in the horizontal direction so as to be aligned with each other, so that the cassette 1 can be also securely stored in the storage section 41.

Embodiment 3

In the aforementioned respective embodiments, the picker 9 and the garage 8a move relatively in the horizontal direction so as to be aligned with each other and, then, the cassette 1 is tilted in step S502. However, the cassette 1 can also be securely stored in the storage section 41 in the following manner. That is, the cassette 1 is tilted and, then, the picker 9 and the garage 8a move relatively in the horizontal direction so as to be aligned with each other. Alternatively, the picker 9 and the garage 8a move relatively in the horizontal direction so as to be aligned with each other, and the cassette 1 is tilted in midstream of the alignment.

Embodiment 4

In the aforementioned respective embodiments, as an example, the retry processing is performed if failing to successfully perform the normal action that the cassette 1 opposing the front opening part 40 of the garage 8a (8b) is pushed out from the picker 9 toward the storage section 41 of the garage 8a (8b) so as to be stored in the storage section 41. However, the cassette 1 can be securely stored in the storage section 41 of the garage 8a (8b) from the picker 9 in the following manner without failure occurred upon performance of the normal action in the aforementioned respective embodiments. That is, the cassette 1 is pushed out from the picker 9 toward the storage section 41 of the garage 8a (8b) so as to be stored in the storage section 41 only by performance of the retry processing without performance of the normal action.

INDUSTRIAL APPLICABILITY

The cassette insertion control method according to the present invention can contribute to improvement in reliability of various devices each requiring an automatic operation for a long period of time, such as a cassette library device.

The invention claimed is:

1. A cassette insertion control method for transferring a cassette held by a picker to a storage section partitioned by a pair of side plates through a front opening part of a garage, the cassette insertion control method comprising:
    a first step of moving the picker in a horizontal direction such that a vertical center axis serving as a center when the cassette held by the picker rotates approaches a target stop position deviated from a center position of the front opening part of the garage;
    a second step of rotating the cassette held by the picker about the center axis such that the cassette is tilted with respect to the storage section of the garage without opposing the storage section of the garage;
    a third step of allowing the cassette to approach the storage section such that a first tip corner part of the tilted cassette enters the storage section through the front opening part of the garage;
    a fourth step of further rotating the tilted cassette about the center axis in a direction that the first tip corner part of the cassette comes into contact with the side plate in a state that a second tip corner part of the cassette is prevented from coming into contact with the side plate;
    a fifth step of allowing the cassette to further approach the storage section;
    a sixth step of moving the picker in the horizontal direction such that the cassette held by the picker approaches the center position; and
    a seventh step of pushing out the cassette toward the storage section, thereby to transfer the cassette from the picker to the storage section.

2. A cassette insertion control method for transferring a cassette held by a picker to a storage section partitioned by a pair of side plates through a front opening part of a garage, the cassette insertion control method comprising:
    a first step of moving the picker in a horizontal direction such that a vertical center axis serving as a center when the cassette held by the picker rotates approaches a target stop position deviated from a center position of the front opening part of the garage;
    a second step of rotating the cassette held by the picker about the center axis such that the cassette is tilted with respect to the storage section of the garage without opposing the storage section of the garage;
    a third step of allowing the cassette to approach the storage section such that a first tip corner part of the tilted cassette enters the storage section through the front opening part of the garage;
    a fourth step of further rotating the tilted cassette about the center axis in a direction that the first tip corner part of the cassette comes into contact with the side plate in a state that a second tip corner part of the cassette is prevented from coming into contact with the side plate;

a fifth step of allowing the cassette to further approach the storage section;

a sixth step of moving the picker in the horizontal direction such that the cassette held by the picker approaches the center position; and a seventh step of pushing out the cassette toward the storage section, thereby to transfer the cassette from the picker to the storage section, wherein the second step of rotating the cassette held by the picker about the vertical center axis such that the cassette is tilted with respect to the storage section of the garage without opposing the storage section of the garage, is performed prior to the first step of moving the picker in the horizontal direction such that the center axis about which the cassette held by the picker rotates approaches the target stop position deviated from the center position of the front opening part of the garage.

3. A cassette insertion control method for transferring a cassette held by a picker to a storage section partitioned by a pair of side plates through a front opening part of a garage, the cassette insertion control method comprising:

a first step of moving the picker in a horizontal direction such that a vertical center axis serving as a center when the cassette held by the picker rotates approaches a target stop position deviated from a center position of the front opening part of the garage;

a second step of rotating the cassette held by the picker about the center axis such that the cassette is tilted with respect to the storage section of the garage without opposing the storage section of the garage;

a third step of allowing the cassette to approach the storage section such that a first tip corner part of the tilted cassette enters the storage section through the front opening part of the garage;

a fourth step of further rotating the tilted cassette about the center axis in a direction that the first tip corner part of the cassette comes into contact with the side plate in a state that a second tip corner part of the cassette is prevented from coming into contact with the side plate;

a fifth step of allowing the cassette to further approach the storage section;

a sixth step of moving the picker in the horizontal direction such that the cassette held by the picker approaches the center position; and a seventh step of pushing out the cassette toward the storage section, thereby to transfer the cassette from the picker to the storage section, wherein the second step of rotating the cassette held by the picker about the vertical center axis such that the cassette is tilted with respect to the storage section of the garage without opposing the storage section of the garage, is performed during a period of the first step of moving the picker in the horizontal direction such that the center axis about which the cassette held by the picker rotates approaches the target stop position deviated from the center position of the front opening part of the garage.

4. A cassette insertion control method for transferring a cassette held by a picker to a storage section partitioned by a pair of side plates through a front opening part of a garage, the cassette insertion control method comprising:

a first step of allowing a vertical center axis and a target stop position to approach each other, the vertical center axis serving as a center when the cassette held by the picker rotates, the target stop position being deviated from a center position of the front opening part of the garage;

a second step of rotating the cassette held by the picker about the center axis such that the cassette is tilted with respect to the storage section of the garage without opposing the storage section of the garage;

a third step of allowing the cassette to approach the storage section such that a first tip corner part of the tilted cassette enters the storage section through the front opening part of the garage;

a fourth step of further rotating the tilted cassette about the center axis in a direction that the first tip corner part of the cassette comes into contact with the side plate in a state that a second tip corner part of the cassette is prevented from coming into contact with the side plate;

a fifth step of allowing the cassette to approach the storage section;

a sixth step of allowing the cassette held by the picker to approach the center position; and a seventh step of pushing out the cassette toward the storage section, thereby to transfer the cassette from the picker to the storage section, wherein in at least one of the first step and the sixth step, the picker and the garage move relatively in a horizontal direction so as to be aligned with each other.

5. A cassette insertion control method for transferring a cassette held by a picker to a storage section partitioned by a pair of side plates through a front opening part of a garage, the cassette insertion control method comprising:

a first step of allowing a vertical center axis and a target stop position to approach each other, the vertical center axis serving as a center when the cassette held by the picker rotates, the target stop position being deviated from a center position of the front opening part of the garage;

a second step of rotating the cassette held by the picker about the center axis such that the cassette is tilted with respect to the storage section of the garage without opposing the storage section of the garage;

a third step of allowing the cassette to approach the storage section such that a first tip corner part of the tilted cassette enters the storage section through the front opening part of the garage;

a fourth step of further rotating the tilted cassette about the center axis in a direction that the first tip corner part of the cassette comes into contact with the side plate in a state that a second tip corner part of the cassette is prevented from coming into contact with the side plate;

a fifth step of allowing the cassette to further approach the storage section;

a sixth step of allowing the cassette held by the picker to approach the center position; and a seventh step of pushing out the cassette toward the storage section, thereby to transfer the cassette from the picker to the storage section, wherein in at least one of the first step and the sixth step, the picker and the garage move relatively in a horizontal direction so as to be aligned with each other, and the second step is performed prior to the first step.

6. A cassette insertion control method for transferring a cassette held by a picker to a storage section partitioned by a pair of side plates through a front opening part of a garage, the cassette insertion control method comprising:

a first step of allowing a vertical center axis and a target stop position to approach each other, the vertical center axis serving as a center when the cassette held by the picker rotates, the target stop position being deviated from a center position of the front opening part of the garage;

a second step of rotating the cassette held by the picker about the center axis such that the cassette is tilted with respect to the storage section of the garage without opposing the storage section of the garage;

a third step of allowing the cassette to approach the storage section such that a first tip corner part of the tilted cassette enters the storage section through the front opening part of the garage;

a fourth step of further rotating the tilted cassette about the center axis in a direction that the first tip corner part of the cassette comes into contact with the side plate in a state that a second tip corner part of the cassette is prevented from coming into contact with the side plate;

a fifth step of allowing the cassette to further approach the storage section;

a sixth step of allowing the cassette held by the picker to approach the center position; and a seventh step of pushing out the cassette toward the storage section, thereby to transfer the cassette from the picker to the storage section, wherein in at least of one of the first step and the sixth step, the picker and the garage move relatively in a horizontal direction so as to be aligned with each other, and the second step is performed during a period of the first step.

* * * * *